UNITED STATES PATENT OFFICE.

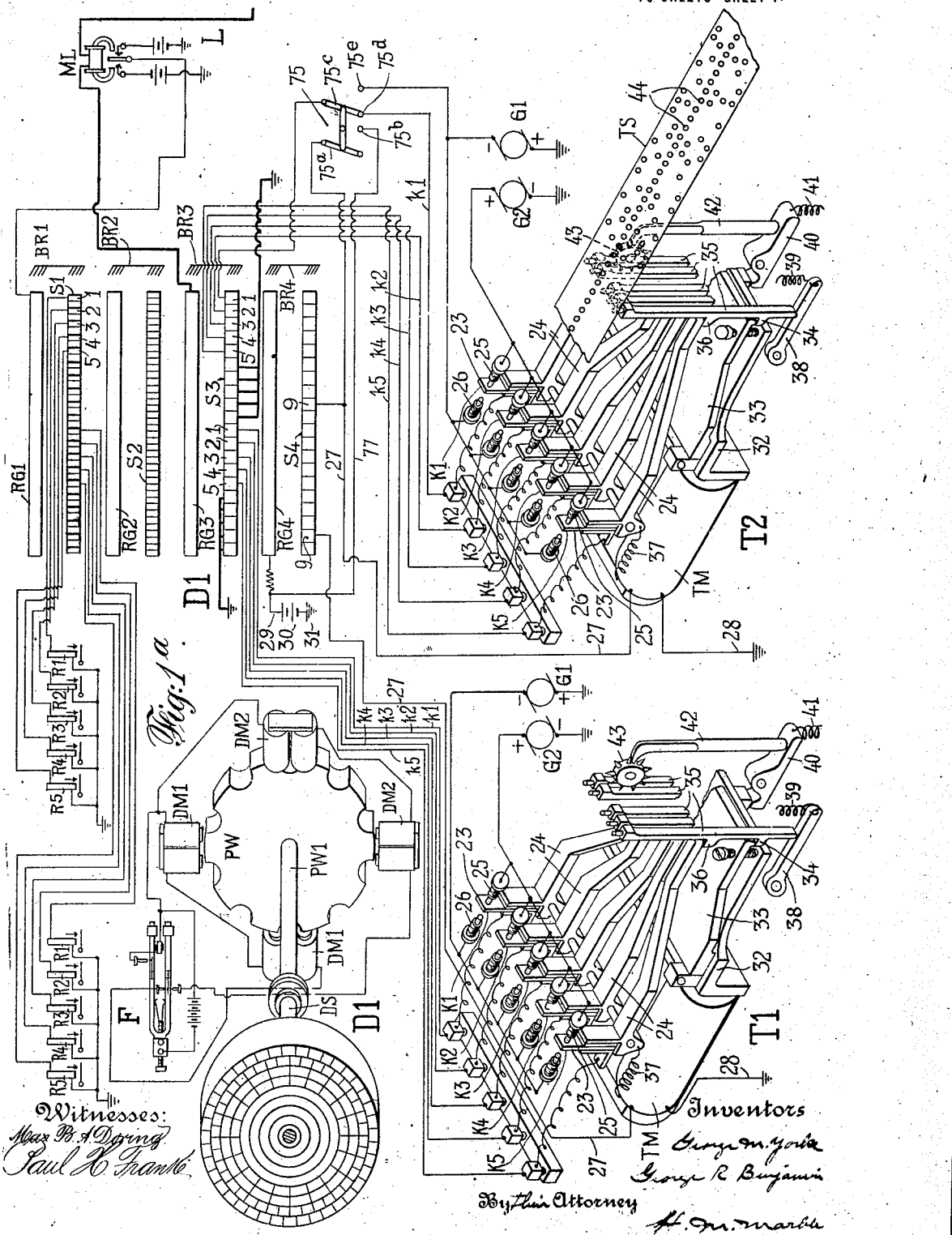

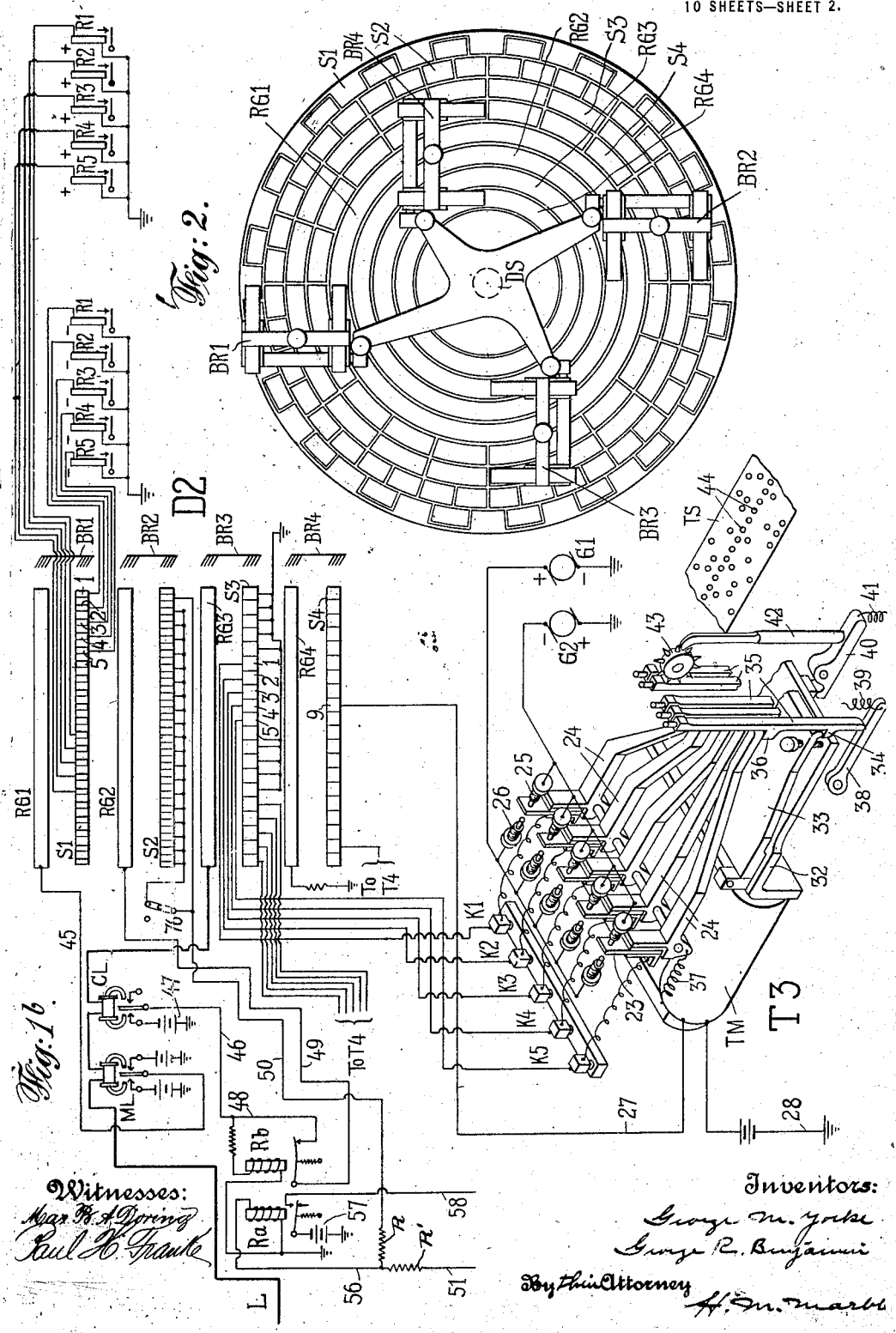

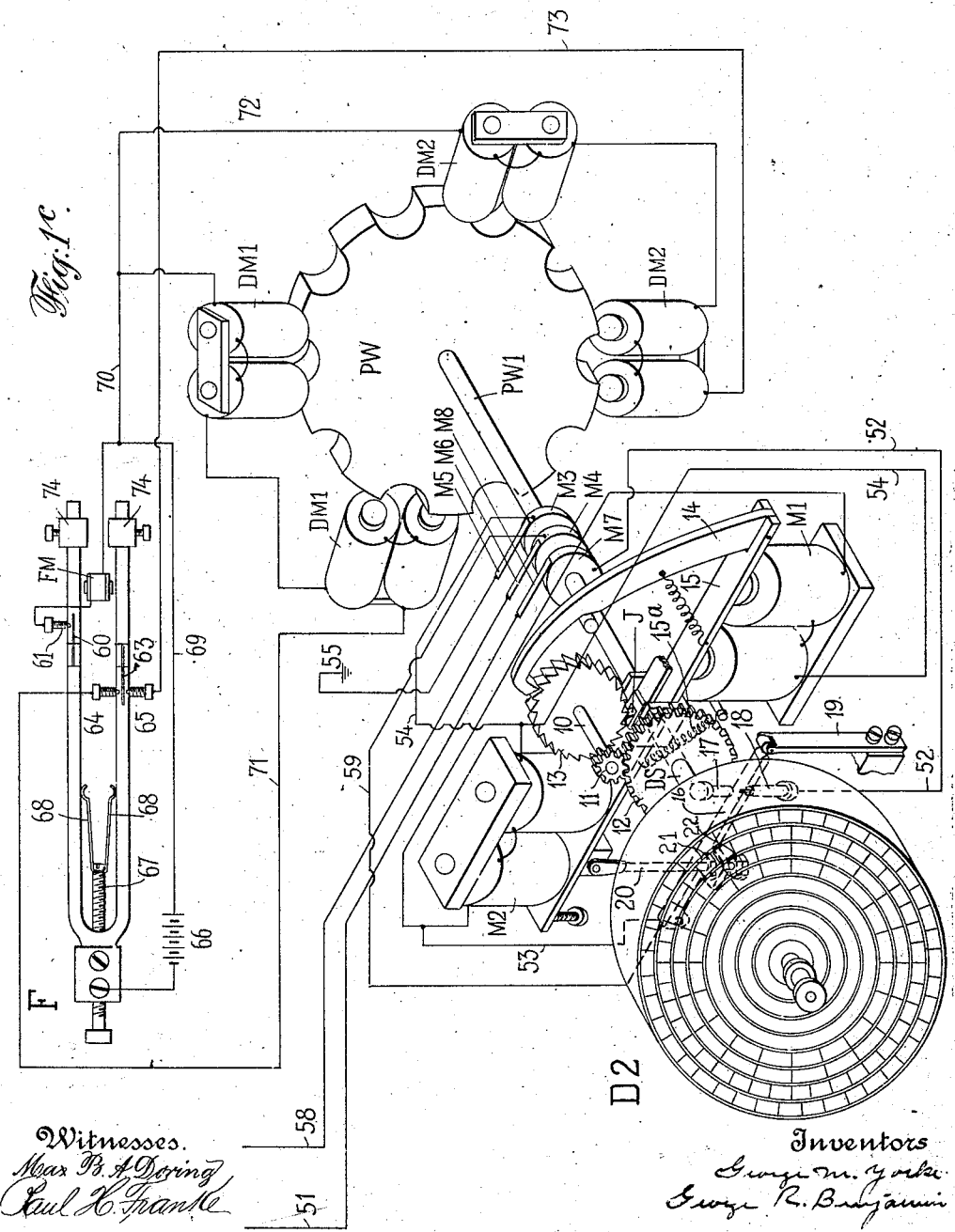

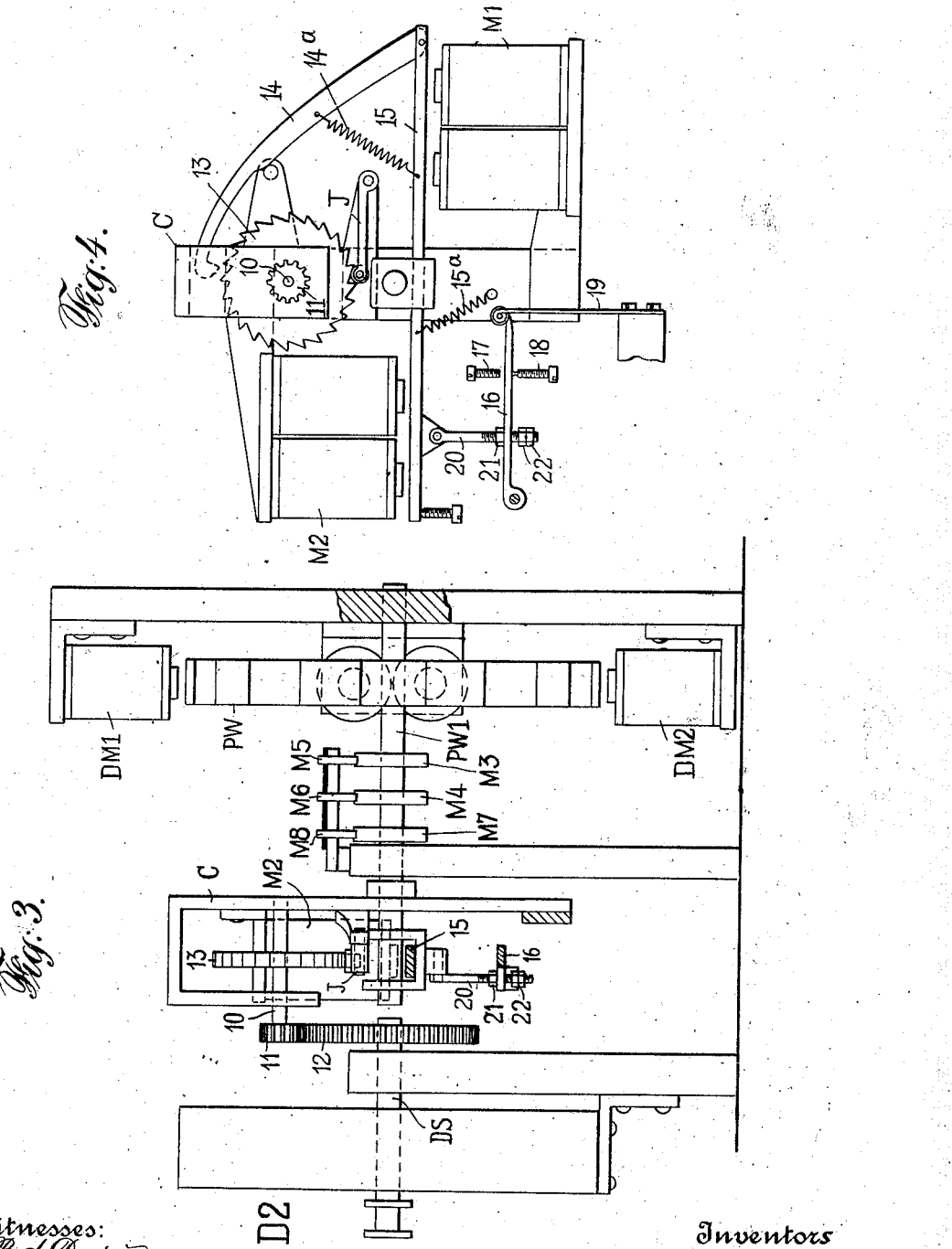

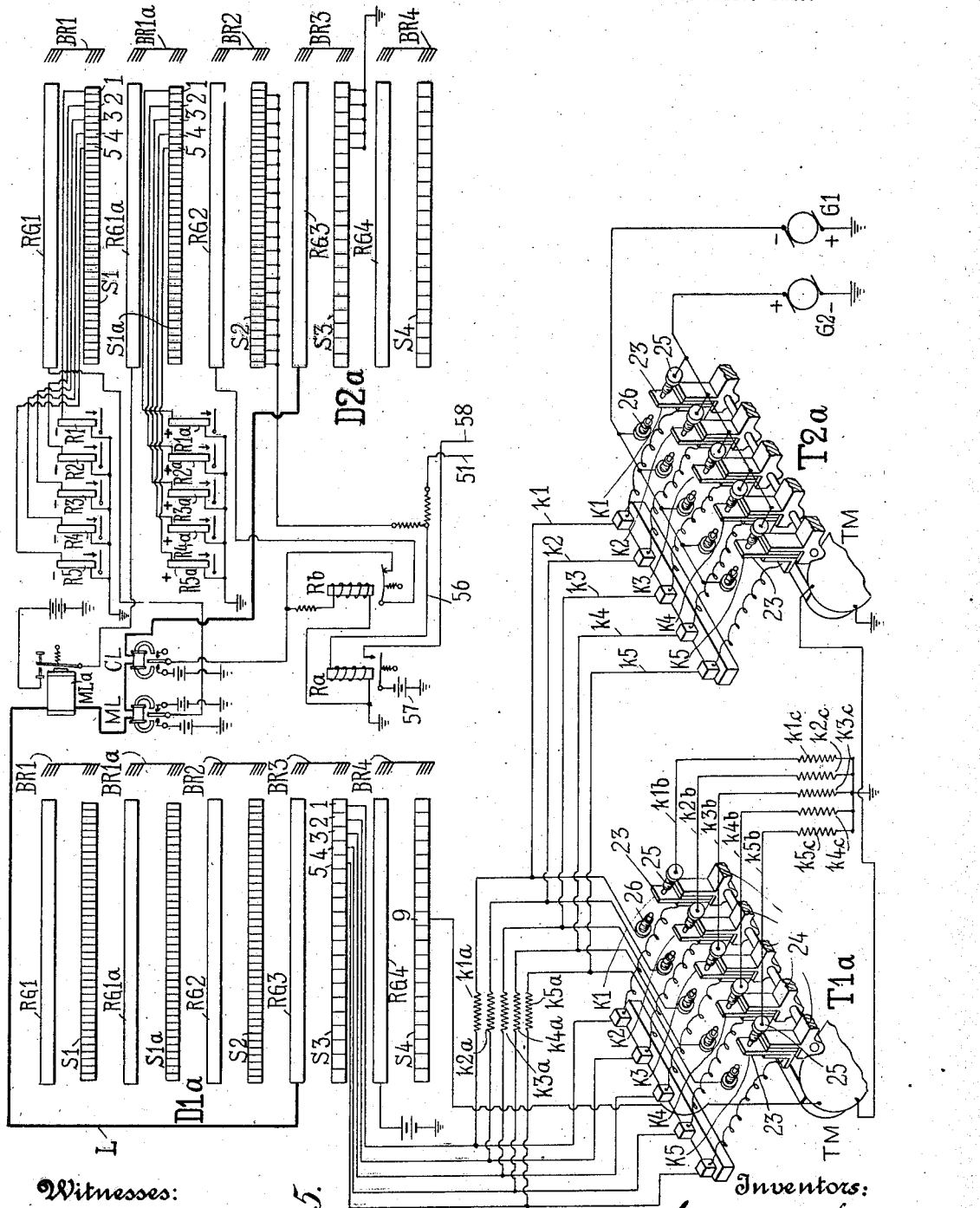

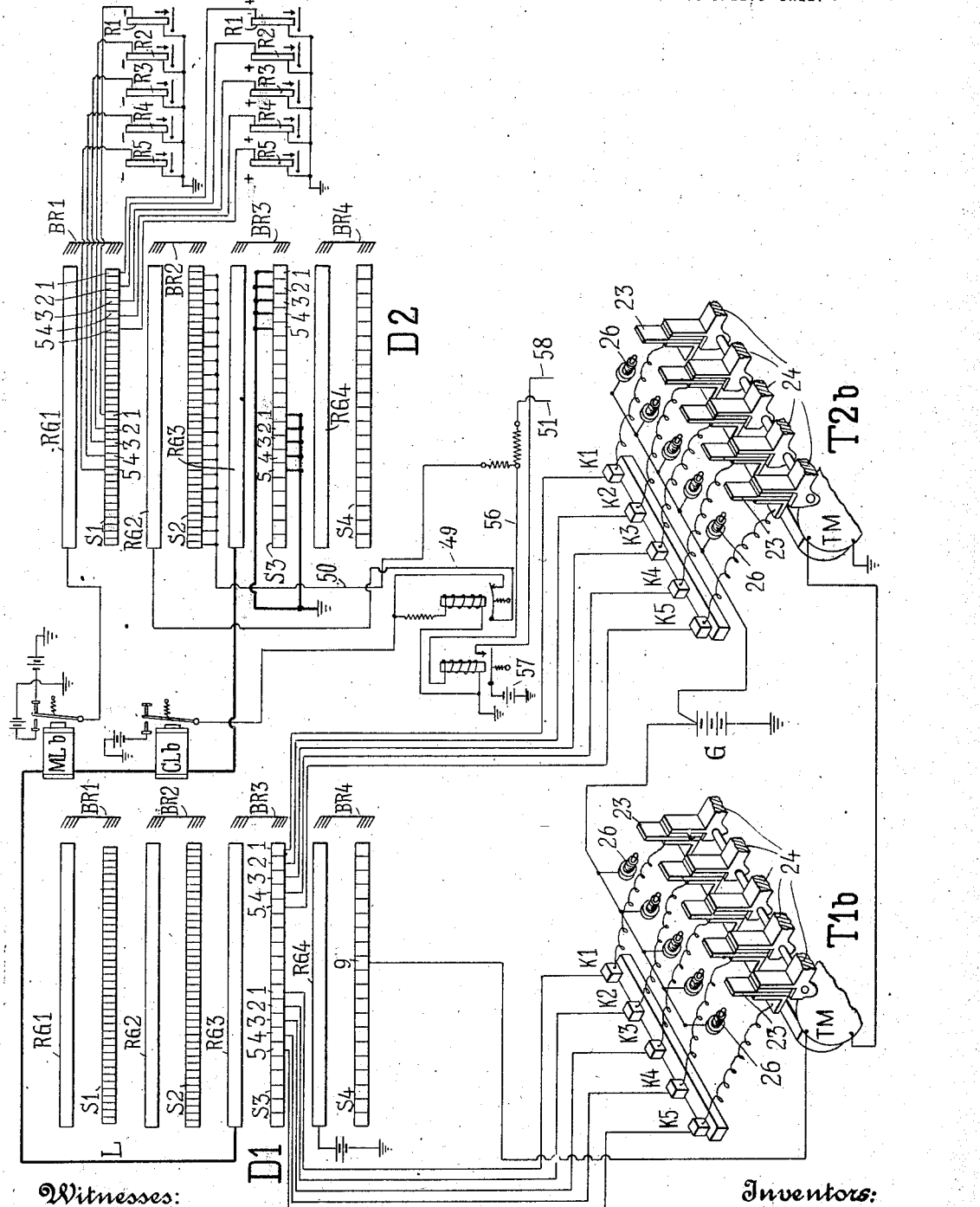

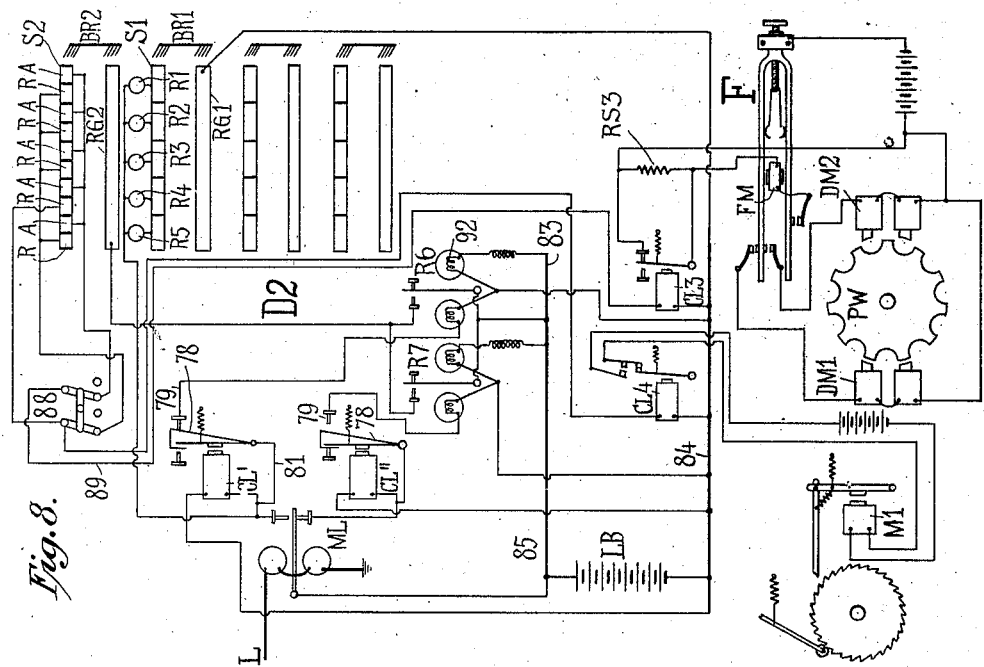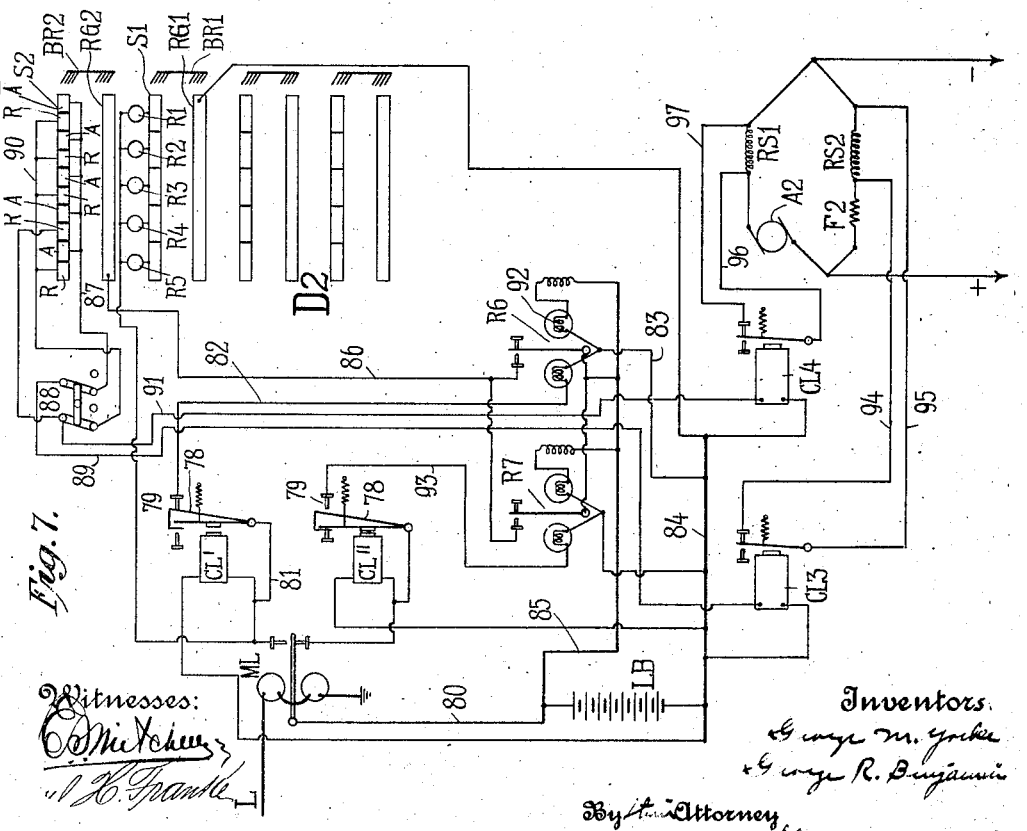

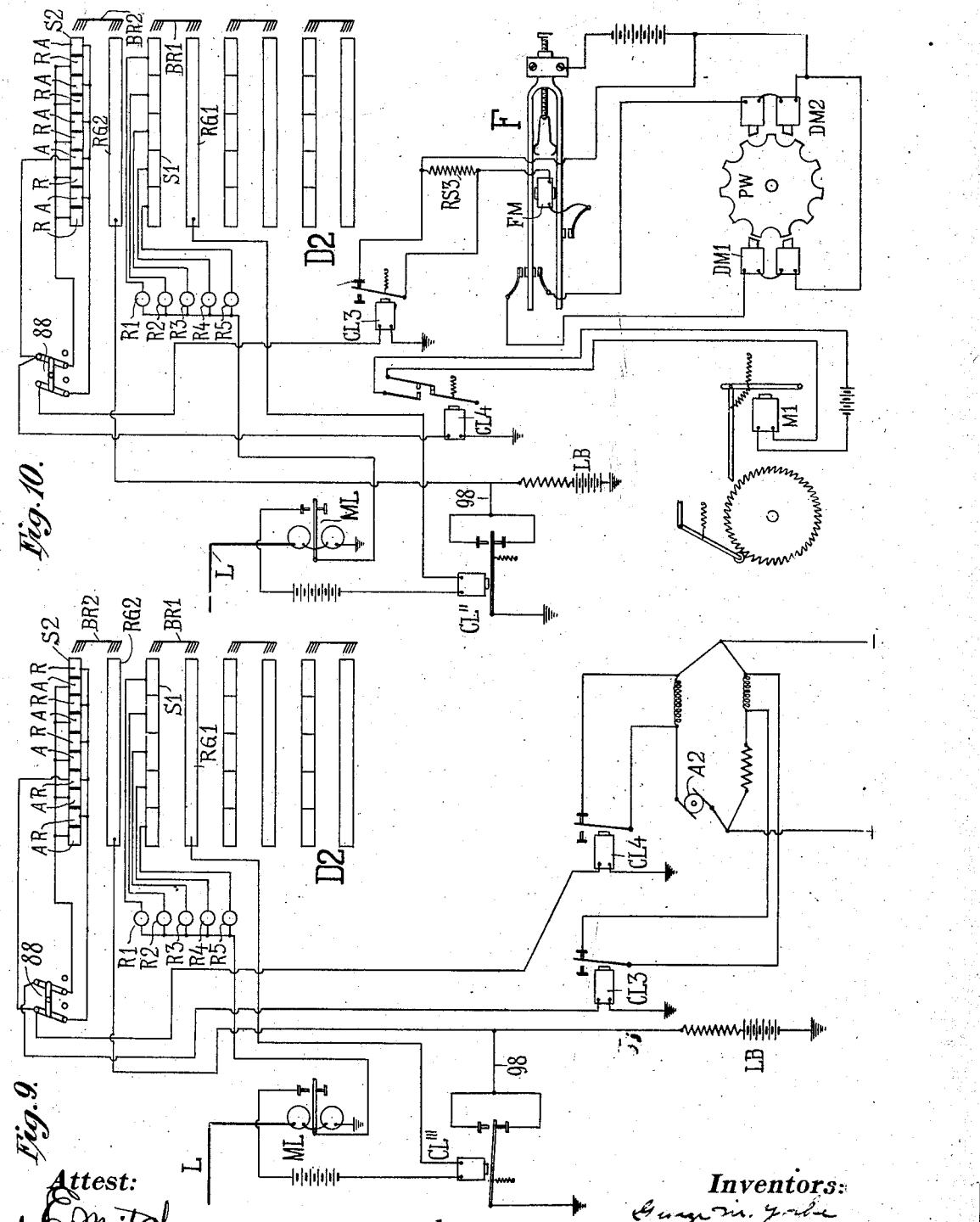

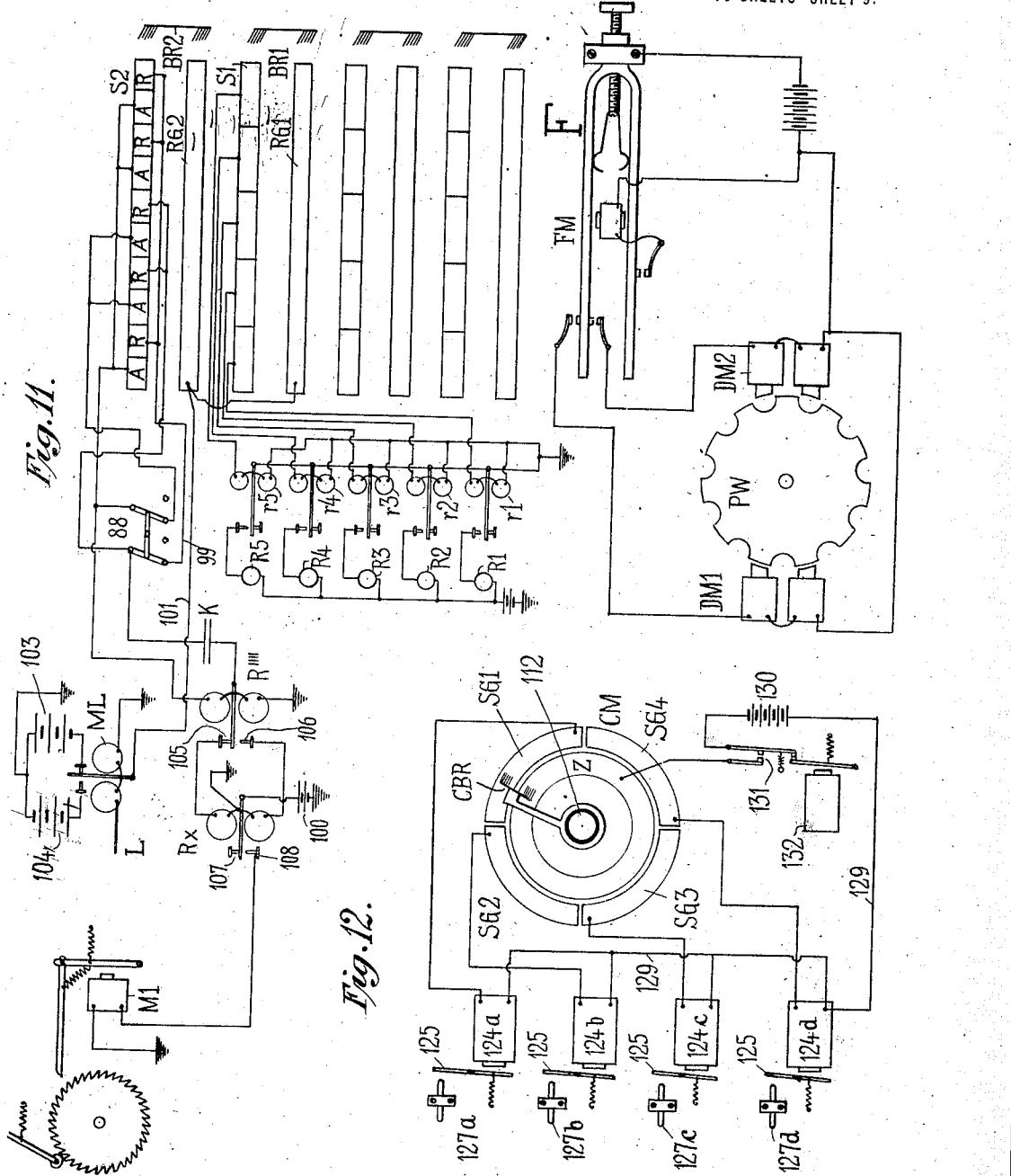

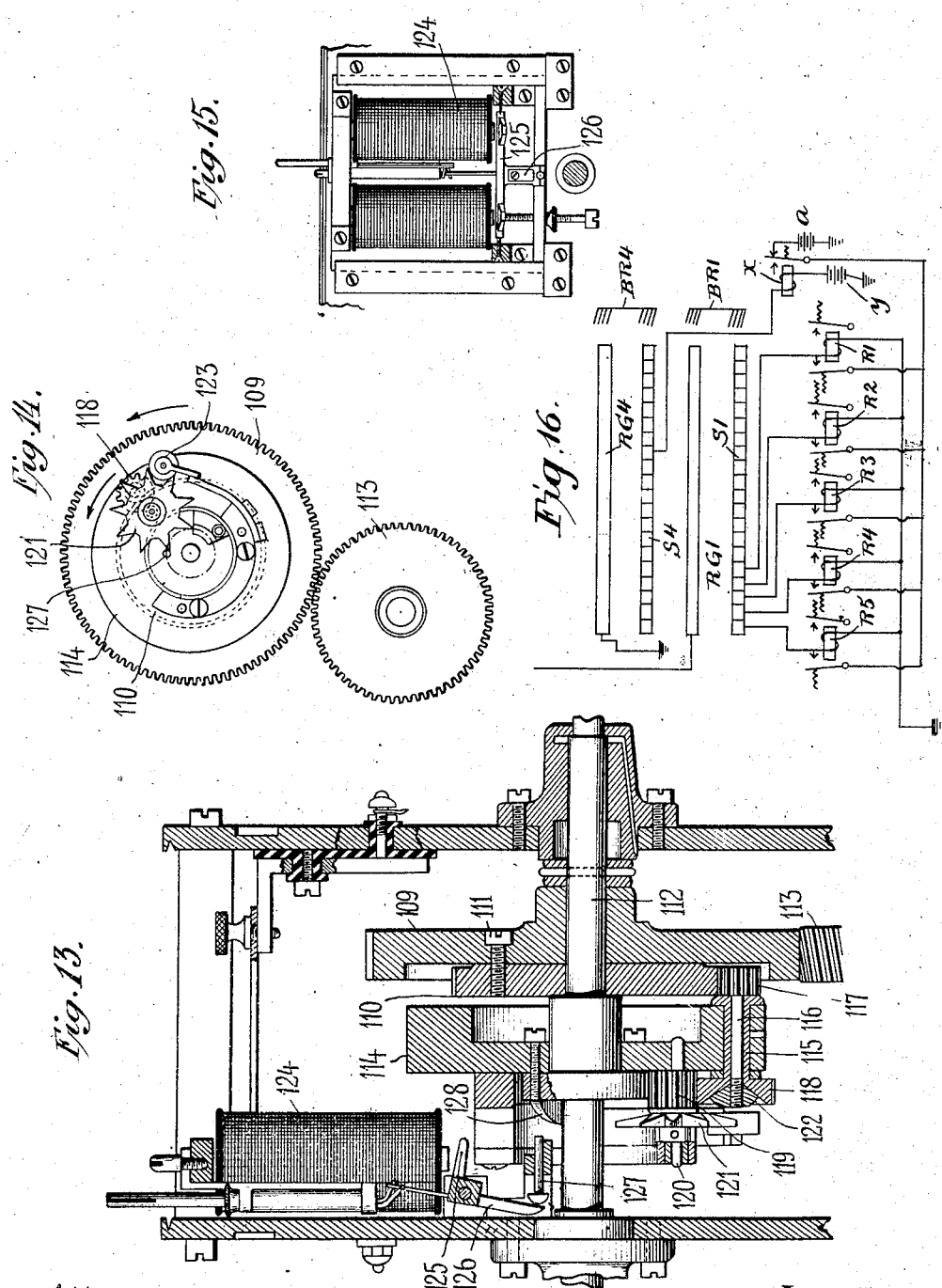

GEORGE M. YORKE, OF NEW YORK, N. Y., AND GEORGE R. BENJAMIN, OF JERSEY CITY, NEW JERSEY, ASSIGNORS TO THE WESTERN UNION TELEGRAPH COMPANY, OF NEW YORK, N. Y., A CORPORATION OF NEW YORK.

MEANS FOR SYNCHRONIZING ROTARY DEVICES.

1,298,622.   Specification of Letters Patent.   Patented Mar. 25, 1919.

Application filed January 5, 1915. Serial No. 654.

*To all whom it may concern:*

Be it known that we, GEORGE M. YORKE, of the city, county, and State of New York, and GEORGE R. BENJAMIN, of Jersey City, Hudson county, and State of New Jersey, citizens of the United States of America, have invented certain new and useful Means for Synchronizing Rotary Devices, of which the following is a specification.

Our invention relates to means for synchronizing a plurality of rotary members, and is particularly intended and adapted for use in so-called synchronous telegraph or signaling systems, though also applicable for other purposes, as, for example, the synchronizing of electric generators and motors. However, since our invention is primarily intended for the synchronizing of distributers or commutators of multiplex telegraph systems, it will be described herein as embodied in such a system, but without any intention on our part of thereby limiting our invention to use in multiplex telegraph systems; and while we describe hereinafter our invention as applied to a multiplex telegraph system of the so-called Baudot type, and to a system wherein one conductor of the line circuit is a metallic conductor, we do not intend thereby to limit our invention either to telegraph systems of the so-called Baudot type, or to telegraph systems wherein one conductor of the line circuit is a metallic conductor; the invention being equally applicable to so-called radio-telegraphy, wherein current waves are transmitted through the air or ether or other agency than a telegraph wire.

Telegraph systems such as that in connection with which our invention is herein illustrated and described, comprise two or more distributers or commutators with means for maintaining synchronism. Each telegraph character consists of a plurality of current impulses (5 impulses for each character, in the particular system herein described), the necessary distinctions between the several characters being obtained by causing one or more of the current impulses of each character to be of opposite "sign" or direction or polarity from the other impulses of that character; the resulting reversals of current sign affording the number of permutations necessary for the distinction of the several letters of the alphabet, punctuation signs, and special signals for the operation of the various parts of the transmitting and receiving apparatus.

In systems such as referred to it is essential that the distributers or commutators shall rotate or move in substantial synchronism; and heretofore, at least in the Baudot system, it has been the common practice to provide special divisions of the commutators for effecting synchronization, the transmitting and receiving apparatus being synchronized once in each complete rotation, provided synchronization is required. According to our invention, we dispense with the separate divisions of the commutators, heretofore provided, particularly in the Baudot system, for effecting synchronization, and instead we employ means whereby each reversal of current sign, employed in the transmission of characters or other signals, is available for synchronization or "correction" (the term "correction" being the term commonly employed in the art, and being the term hereinafter employed, with reference to the establishment or reëstablishment of synchronism between the transmitting and receiving apparatus). Thereby we materially increase the effective speed of transmission, and also materially simplify the apparatus besides obviating the otherwise numerous opportunities for errors in transmission and making it possible to maintain constantly very accurate synchronism and to bring the transmitting and receiving apparatus into accurate synchronism, both as to speed and as to phase, very quickly, when the apparatus is started up. Our invention consists, therefore, in improved synchronizing means; particularly synchronizing means wherein each reversal of line current or polarity is available for "correction"; though various portions of the apparatus embodying our invention are adaptable for use in systems wherein synchronization is effected otherwise than by each current reversal or reversal of polarity.

This improved correcting means affords the following important advantages:

1. Every change of sign of the signaling impulses, or, in systems operating by current pulses of one direction only, every change of current strength, provides a possible correction moment.

2. At this correction moment the correcting devices will be operated if the correction is required, and will not be operated if the correction is not required.

3. As the telegraph signals consist of various combinations of positive and negative impulses, or, in systems operating by current impulses of one direction only, of various combinations of impulses of different strength, or of impulses and spaces, many correction moments are available during each revolution of the distributer brushes.

4. Because of the foregoing characteristics of our system, no special correcting impulses are required.

The objects of our invention are to maintain accurate synchronism constantly; to avoid errors in transmission or in operation of the apparatus due to lack of perfect synchronism; to bring the transmitting and receiving apparatus into synchronism and proper phase relation very quickly, when the apparatus is started up; to increase the effective speed of transmission; to simplify the apparatus employed; to make it very easy to operate the apparatus; and in general to make the apparatus relatively simple and easy of comprehension and to avoid opportunity for derangement.

We will now proceed to describe our invention with reference to the accompanying drawings, and will then point out the novel features in claims. In said drawings:

Figures 1ª, 1ᵇ and 1ᶜ (which together constitute one complete figure) illustrate diagrammatically a system and apparatus embodying our invention and comprising two transmitting and receiving sets at each end of the line with one synchronizing apparatus for the combined distributing and receiving commutators of the line, certain parts of the apparatus being shown fragmentarily and in perspective and more or less schematically; Fig. 1ª showing the principal circuits and apparatus at one end of the line, Fig. 1ᵇ showing the principal circuits and apparatus at the other end of the line, and Fig. 1ᶜ showing the mechanical correcting apparatus constituting a portion of the synchronizing apparatus, employed at one end of the line. Fig. 1ᶜ is to be considered as a continuation of Fig. 1ᵇ in particular, certain of the circuit conductors of Fig. 1ᶜ being continuous with corresponding circuit conductors of Fig. 1ᵇ.

Fig. 2 shows a face view of the rings and brush structure of the distributer.

Fig. 3 shows a side view and partial section of a distributer provided with correction apparatus, the brush structure of the distributer being omitted; and Fig. 4 shows a front elevation of the correction apparatus of the distributer itself, its support and its gear 12 being omitted.

Fig. 5 is a diagrammatic view showing distributers at the two ends of a line, and showing two transmitters operating through one channel of communication of the two distributers; other possible channels of communication of the two distributers being vacant.

Fig. 6 is a diagrammatic view showing distributers at the two ends of a line, and showing two transmitters operating through different channels of communication of the distributers, and each operating by currents of one direction only.

Fig. 7 is a diagrammatic view of receiving and correction apparatus, at one end of a line, showing means for correcting by both acceleration and retardation of the receiving distributer.

Fig. 8 is a view similar to Fig. 7 except that the correcting relays are shown as controlling different means from that employed in Fig. 7, for effecting acceleration or retardation of the receiving distributer.

Fig. 9 is a view similar to Fig. 7, except that different means are shown for controlling the local correcting relays.

Fig. 10 is a view similar to Fig. 9 except that the correcting relays control the distributer motor in the manner indicated in Fig. 8.

Fig. 11 is a view similar to Fig. 7, except that means is shown for effecting correction in one sense only, and for effecting that correction by means of current impulses of alternately opposite sign produced by the action of the main line relay.

Figs. 12–15 inclusive illustrate means for control, according to our invention, of the correcting means of the well known Baudot distributer, Fig. 12 being a diagram illustrating means for the control of the stop pin magnets of the distributer; Fig. 13 being a fragmentary longitudinal sectional elevation of the correcting mechanism of the Baudot distributer; Fig. 14 being a diagrammatic elevation of the gearing of the Baudot distributer, and Fig. 15 being a front elevation of one of the correcting magnets, and associated parts, such as may be used when our invention is applied to the Baudot distributer.

Fig. 16 is a diagram illustrating an electrical "lock-up" for relays R1—R5.

Referring first to Figs. 1ª and 1ᵇ: D1 (Fig. 1ª) and D2 (Fig. 1ᵇ) designate transmitting and receiving distributers or commutators, D1 being located at one end of the line and D2 being located at the other end of the line, the two distributers being similar. In Fig. 1ª distributer D1 is shown twice; once, developed, in the upper central portion of the figure, and again, in perspective and in connection with its driving motor (but without circuit connections or brushes) in the upper left hand side of the figure; and in Fig. 1ᵇ distributer D2 is also shown, developed, while in Fig. 1ᶜ distributer D2 is shown in perspective, in connection with the driving motor and correction apparatus, but without circuit connections or brushes.

Each of the distributers D1 and D2 comprises a plurality of rings (8 rings in the construction shown) which are connected in pairs by suitable brushes, one ring of each pair being segmented and one ring of each pair being plain or continuous. Rings S1 and RG1 form one pair rings, of which ring S1 is segmented, these rings being connected by brushes BR1; these two rings and their brushes being employed for receiving. Rings S2 and RG2 form another pair of rings of which ring S2 is segmented, these two rings being employed for synchronization or correction, and being connected by brushes BR2. Rings S3 and RG3 form another pair of rings, employed for transmission, and are connected by brushes BR3; ring S3 being segmented as shown; and rings S4 and RG4 form another pair of rings employed for the control as hereinafter described of the automatic transmitting apparatus, and other local purposes, and are connected by brushes BR4.

T1 and T2 in Fig. 1ᵃ, designate similar automatic transmitting apparatus, arranged to be controlled by a suitable perforated tape, such as the tape TS shown in connection with T2. Each comprises a plurality of current reversing transmitting contacts (in the construction shown, five such sets of transmitting contacts K1, K2, K3, K4 and K5) each connected as hereinafter described by an appropriate conductor to a correspondingly numbered segment of transmitting ring S3 of the corresponding distributer. In Fig. 1ᵇ another similar automatic transmitting apparatus T3 is shown, and it is to be understood that in connection with what is shown in Fig. 1ᵇ still another automatic transmitting apparatus, which if shown might be designated by character T4, is used, only circuit connections for this fourth transmitter being shown. The particular tape-controlled transmitting apparauts T1 or T2 or T3 etc., illustrated, forms no portion of the present invention; and as various tape operated transmitting apparatus are known in the art and may be employed in connection with the present invention, we have illustrated the transmitting apparatus schematically only, and only to such extent as seems to be desirable for the description of the apparatus embodying the present invention. Indeed, ordinary current reversing hand-operated transmitting keys might be employed in lieu of the several transmitting contact devices K1—K5 of each transmitter; and automatic tape-controlled transmitting devices are illustrated in Figs. 1ᵃ and 1ᵇ merely because some such automatic transmitting devices are commonly employed, and must, apparently, be employed, in order to obtain the desired high rate of transmission, on land line circuits at least.

We have indicated dynamo generators G1 and G2, for supplying line current, for each transmitter, the polarities of these generators being opposite, as is common when dynamo generators are employed for supplying line current to a telegraph line; however, the particular means for supplying current to the line is unimportant, as is the particular means employed for supplying current of one or the other to the line, as desired.

One complete set of synchronizing apparatus is all that is required for one circuit, however many transmitting and receiving sets may be operated over that circuit.

ML, ML designate main line relays, of which there is one at each end of line L, and CL designates a correcting relay, shown in this instance as connected in series with the corresponding main line relay ML. Ra and Rb (Fig. 1ᵇ) designate other correcting relays, controlled by relay CL as hereinafter described. R1, R2, R3, R4 and R5 designate selecting relays, of which there is one set for each channel of communication, said selecting relays being connected to corresponding segments numbered 1—5 inclusive of ring S1 of distributers D1 and D2; which relays R1—R5 inclusive are, in practice, employed for the control of an electro-magnetically operated mechanical selecting device of a telegraph printer, itself not otherwise indicated in the drawings. Telegraph printers comprising electromagnetically controlled mechanical selecting devices adapted for control by a bank of relays such as R1—R5 inclusive, are well known in the art, and hence it is not thought necessary to illustrate such a printer, or the mechanical selecting apparatus thereof, in the accompanying drawings.

We commonly drive the brush structures of the distributers at the two ends of the line by so-called LaCour wheels PW (Figs. 1ᵃ and 1ᶜ), each mounted to rotate upon a shaft PW1 and having suitable teeth and also two pairs of electromagnets DM1 and DM2 the magnets of each pair being connected in series. The LaCour wheel is itself a well known form of electric motor, of which it is only necessary to say here that its nature is such that if the magnets DM1 and DM2 be energized and deënergized in alternation, and if the wheel PW be once started in rotation, at a speed corresponding (with respect to the number of its teeth) to the speed of energization and deënergization of such magnets, the wheel will continue in rotation at such speed, under the influence of the said magnets; the LaCour motor being particularly suitable for present purposes, since its speed of rotation in practice corresponds exactly to the rate at which the operating magnets are energized and deënergized, and if this rate of energization and deënergization be varied slightly from time to time, the speed of the wheel will change to correspond. However, we do not limit ourselves to the use of the LaCour motor for driving the distributer brushes.

The brush structure of each distributer is mounted upon another shaft DS (which, in the case of the distributer D2, which is arranged to be corrected, is not directly connected to shaft PW1, but connected to that shaft PW1 through gearing, as hereinafter described).

In general, correction apparatus is required at one end of the line only. We have shown no correction apparatus for the distributer D1 in Fig. 1ª but have shown such correction apparatus for distributer D2, in Fig. 1ᶜ; for which reason the distributer D2, and LaCour motor therefor, are shown on a larger scale in Fig. 1ᶜ, than the illustration of the corresponding parts of distributer D1 in Fig. 1ª. However, it will be understood that it is quite practicable, and in some cases convenient, to provide correction apparatus for both distributers, though the correction apparatus of only one distributer will be in use at any one time, ordinarily. The construction of the correction apparatus of distributer D2, shown in Fig. 1ᶜ and Figs. 3 and 4, is as follows:

Upon shaft PW1 is mounted the frame C, (see particularly Figs. 3 and 4) carrying magnets M1 and M2 (two such magnets are shown in the construction illustrated, though one magnet is all that is required, it being preferable to use two magnets, upon opposite sides of the axis of rotation, in order that the structure may be in rotative balance) and current is transmitted to these magnets through contact rings M3, M4 and M7 upon shaft PW1, and corresponding brushes M5, M6 and M8. Frame C carries a shaft 10 upon which is mounted a gear 11 intermeshing with a gear 12 on shaft DS. On shaft 10 there is also a ratchet wheel 13 engaged normally by the spring actuated pawl 14 mounted upon the rocking armature lever 15, common to the two magnets M1 and M2, which armature is pivoted to the frame C. It will be clear that, with the frame C in rotation, and with the ratchet wheel 13 held by the pawl 14, as hereinafter described, rotation of the shaft PW1 and frame C will be communicated through gears 11 and 12, to the shaft DS, and the ring structure of the distributer D2. A spring jockey J bears against the periphery of ratchet wheel 13 and prevents said ratchet wheel from turning with respect to frame C except as such ratchet wheel is actuated by the pawl 14. A contact arm 16 is pivoted to the frame and is adapted to play between stop 17 and contact stop 18; and a spring jockey 19, bearing against the wedge-shaped end of contact arm 16, tends to hold such contact arm against the one stop or the other. This contact arm 16 is actuated from armature lever 15 by means of a link 20 provided with two nuts, 21 and 22, on opposite sides of said arm 16, there being some play between such nuts and arm, providing a certain amount of lost motion in the operation of the arm 16.

Assuming the LaCour wheel PW to be in rotation, it will be clear that as it rotates it drives shaft PW1 and thence, through frame C, shaft 10 (held stationary with reference to frame C by ratchet wheel 13, pawl 14, and jockey J), gear 11 and gear 12, drives shaft DS, and so drives the brush structure of distributer D2, (which brush structure is not shown in Fig. 1ᶜ, but is shown in Fig. 2). If now the circuit of magnets M1 and M2 be closed, momentarily, it will be apparent that armature lever 15 will be attracted and will move the pawl 14, thereby moving the ratchet wheel 13 through the space of one tooth; which motion of ratchet wheel 13 with relation to frame C is transmitted through shaft 10, gears 11 and 12 and shaft DS to the brush structure of distributer D2, and will move such brush structure backward slightly with reference to shaft PW1.

As will be explained hereafter, in the synchronizing arrangement indicated in Figs. 1ª, 1ᵇ and 1ᶜ, the LaCour motor driving distributer D2 has normally a speed very slightly in excess of the normal speed of the LaCour motor driving distributer D1; consequently the brushes of distributer D2 constantly tend to advance in phase with respect to the brushes of distributer D1; and as will be explained hereafter, such slight advance in phase of brushes of distributer D2 with reference to the brushes of distributer D1 is corrected from time to time, by the stepping back of such brushes of distributer D2 by the action of the magnets M1 and M2, the pawl 14 and ratchet wheel 13, etc. The circuits by which magnets M1 and M2 are energized and such stepping backward of the brushes of distributer D2 effected, will be traced hereinafter.

Correction mechanism which operates by advancing or retarding the brushes, with reference to the means by which said brushes are rotated, is commonly termed "clock hand" correction mechanism, presumably from the resemblance of the method of correction employed to the method commonly employed for correcting the setting of the hands of a clock during the running of the movement of that clock.

The correction mechanism above described constitutes one type of such correction mechanism. "Clock hand" correction has numerous advantages over other methods of correction, for example, over correction by varying the speed of a driving motor; one advantage being that the correction is instantaneous.

The several tape controlled transmitters T1, T2 and T3, etc., being of the same construction, we will describe only one of them.

The contacts K1, K2, etc., of the automatic tape-controlled transmitting devices each comprise a contact tongue 23 mounted upon a spring actuating rocking lever 24, and two contact stops, 25 and 26; of which contact stops, those numbered 25 are connected to generator G2, and those numbered 26 are connected to generator G1, while the contact tongues 23 are each connected by a conductor k1, k2, etc., to the corresponding segment, 1, 2, etc., of distributer ring S3. Each such transmitting device is provided with an electromagnet TM. The distributer ring S4 is provided with segments corresponding to the segments of distributer ring S3 and to one of these segments of ring S4 (any one of those segments, so long as it is a segment spaced well away angularly from the segments 1—5 inclusive of ring S3 to which the corresponding transmitter is connected) is connected a conductor 27 leading through the magnet TM to ground at 28. The circuit of conductor 27, in the other direction, passes through that particular segment of ring S4 to which it is connected, and through brush BR4 (when that brush is in contact with such segment of ring S4) to ring RG4 and thence through conductor 29 and battery 30, or other suitable source of current supply, to ground at 31. 32 designates a pivoted armature for magnet TM, upon which is mounted a plate 33 adapted to engage lugs 34 on a plurality of pins 35 the upper ends of which pins are adapted to enter corresponding perforations in the tape TS. There is one such in 35 for each of the keys K1—K5 inclusive; and each of the pins 35 is provided with a further lug 36 against which rests normally the end of the corresponding rocking lever 24 of the corresponding transmitting key K1—K5 inclusive. These rocking levers are provided with springs 37 tending to depress them. Each pin 35 rests at its lower end, upon a pivoted lever 38 having a spring 39, tending to raise that lever; the springs 39 being adjusted to be somewhat stronger than the springs 37. A further spring actuated rocking lever 40 is provided, this lever being arranged to be engaged by armature 32; when that armature is attracted, thereby moving lever 40 against the tension of its spring 41; and as lever 40 carries a projection 42 adapted to engage a star wheel 43 and move the same forward step by step. The star wheel is arranged to engage the central row of perforations 44 of tape TS, in the manner well known in the art, and thereby to advance such tape step by step. It will be seen from the above explanation that the operation of the transmitting apparatus is as follows: Supposing the segment of distributer ring S4 to which conductor 27 is connected (the segment numbered 9 in Fig. 1ª) to make contact with brush BR4, a circuit is thereby completed from ground, through conductor 28, magnet TM, conductor 27, segment 9 of ring S4, brush BR4, ring RG4, conductor 29, battery 30, to ground at 31; the armature 32 being thereby attracted and caused to engage the lug 34 of any pin or pins 35 which may just previously have been in elevated position, thereby "clearing" the transmitter, freeing the pins 35 from the tape TS, and causing the lever 40—42 to advance the star wheel 43 one step, and thereby to advance the tape TS one step. As soon as the said segment 9 of ring S4 leaves the brush BR4, the circuit through magnet TM is broken and armature 32 is released, such of the pins 35 as may be beneath perforations of the tape TS in the new position of that tape, being permitted to rise, under the influence of their springs 39; and when such pins rise they carry upward with them the armature 32, also their corresponding key-levers 24, so shifting the contact tongues 23 of those levers into contact with the corresponding back stops 26; whereby a new set of contacts is "set up" in the transmitter, the particular contacts so set up corresponding to the particular row of perforations of tape TS then over the pins 35. When, during the rotation of brush BR3 over rings S3 and RG3, of distributer D1, said brush BR3 contacts with that set of segments 1—5 inclusive of rings S3, corresponding to the transmitter T1 or T2 under consideration, positive or negative current impulses will be transmitted through line L according as the contact tongues K1-K5 inclusive, electrically connected to such segments 1—5 inclusive of ring S3, are in contact with their rear stops 25 or with their front stops 26. After brush BR3 has passed over such segments 1—5 inclusive of ring S3, brush BR4 makes contact with segment 9 of ring S4, and thereby magnet TM is again energized, its armature 32 is depressed, carrying down with it those pins 35 which previously had been elevated, thus clearing the transmitter and freeing the tape TS, which is again advanced one step by actuation of the star wheel 43 by lever 40—42, itself actuated by the descent of the armature 32.

It will be seen that the effect of the operation of each transmitter T1 and T2 and of distributer D1 is to send through the line L, a succession of five current impulses, some of which will, in general, be negative impulses, and others of which will, in general, be positive impulses, the particular relative arrangement of positive and negative impulses in such series depending upon the particular character transmitted. Since each of the two transmitters shown in Fig. 1ᵃ is connected to a different quadrant of distributer D1, and since the two transmitters at the opposite end of the line, connected to distributer D2, are connected to quadrants of that distributer corresponding to the quadrants of distributer D1 to which no transmitters are connected, it follows that during each rotation of the distributers a continuous series of current impulses is transmitted through line L, some of such impulses being, in general, positive, and others of such impulses, being, in general, negative. These current impulses in line L will actuate relays ML and CL. In Figs. 1ᵃ and 1ᵇ the armature of these relays are shown intermediate their contact stops; but in general such armature will be against one contact stop or the other, except at the instant of occurrence of a current reversal in the line, at which instant the armatures of relays ML and CL will both move toward the opposite stop. The two contact stops of each of these relays ML are commonly connected to sources of current supply of opposite polarity.

We will now describe the connections of relays ML and CL in Fig. 1ᵇ, the connections of relay ML in Fig. 1ᵃ being similar to those of relay ML in Fig. 1ᵇ, no relay CL being required in Fig. 1ᵃ, since no correction device is shown in connection with the distributer of Fig. 1ᵃ.

The armature of relay ML is connected by conductor 45 to ring RG1 of distributer D2; and segments 1—5 inclusive of the corresponding ring S1 (these segments 1—5 inclusive corresponding to one of the sets of segments 1—5 inclusive of ring S3 of distributer D1) are each connected, as previously explained, to a corresponding relay of one relay bank R1 to R5 inclusive. These relays R1—R5 inclusive may be understood either to be polarized and so arranged to respond only to current pulses of one direction—in the particular arrangement shown, one bank to respond only to negative impulses, the other to respond only to positive pulses—or may be understood to be nonpolarized relays provided with mechanical or electrical "lock-up" means of such character that each relay, when actuated, remains locked until subsequently released. Both arrangements are known. Supposing a negative current impulse in line L to move the armature of relay ML of Fig. 1ᵇ to the left, while brush BR1 of distributer D2 is on one of the segments 1—5 inclusive of ring S1 of distributer D2, the corresponding relay of bank R1—R5 inclusive will be actuated.

Fig. 16 shows one well known form of electrical "lock-up" means that may be employed in connection with these relays R1—R5. For simplicity, in this figure, only rings RG1 and S1, and RG4 and S4 are shown, intermediate rings of the commutator being omitted. When, during the passage of the brush BR1 over segments of rings S1 connected to the magnets of relays R1—R5 inclusive, one of those magnets is energized as above described, the corresponding armatures of that magnet are attracted; one of these armatures closes a local circuit from a battery $a$ through the rear contact of a relay $x$ and the said armature and front contact of the relay so energized, to return; the magnet of such relay being thereby held energized. After the passage of brush BR1 over the last of such segments of ring S1, brush BR4 passes over a segment of ring S4 in circuit with the magnet of relay $x$, and thereby a circuit is completed from the battery $y$ through the magnet of such relay $x$, and the said segment of ring S4, brush BR4 and ring RG4, to ground, so momentarily energizing the magnet of relay $x$, attracting the armature of that relay, and so breaking the holding circuit of relays R1—R5 inclusive, thereby "clearing" the bank of relays R1—R5.

*Synchronization.*

As previously explained, distributers D1 and D2 must rotate in synchronism and in proper phase relation. The alternate energization of magnets DM1 and DM2 of the LaCour motors which drive these distributers is effected in the arrangement shown, by tuning fork contact devices F in a manner hereinafter described. It is characteristic of these tuning fork contact devices that they vibrate, for any one adjustment, at a very constant speed; but are susceptible of a wide range of adjustment; the speed of the LaCour motor driving the distributer corresponding exactly, as previously explained, to the speed of its controlling tuning fork contact device F. But no matter how accurate the adjustment of tuning fork contact devices controlling the speed of the two distributers, some difference in speed will necessarily exist, necessitating correction to restore proper phase relation. We will hereinafter describe means for correction by either advance in phase or retardation in phase, as may be required; but in the arrangement shown in Figs. 1ᵃ, 1ᵇ and 1ᶜ, correction is effected in one sense or direction only, i. e., in the arrangement shown, by retardation in phase. Therefore, the tuning fork controlling the receiving distributer D2 is arranged to drive its distributer at a rotative speed very slightly greater than that of distributer D1, so that frequent slight retardation in phase of distributer D2 is required. While, as will appear hereinafter, it is quite practicable to provide means for correction by either advance or retardation, or both, the apparatus is much simplified by driving the one distributer constantly at a speed slightly greater than that of the other distributer, and effecting correction by frequent slight adjustment of phase in one direction or sense only (in the construction shown, by retardation in phase).

As previously explained, the armature of relay CL vibrates in unison with the armature of ML. Supposing the armature of relay CL to move to the left, a circuit is completed from ground through battery 47 or other source of energy to the left stop of that relay, through conductor 46 and the coils of relay R$b$ to ground. There is another circuit path from conductor 46 through conductor 48, the armature of relay R$b$ (when that armature is in retracted position) and conductor 49 to ring RG2 of distributer D2, and thence through brush BR2, of that distributer, to ring S2 of that distributer and thence through conductor 50 and the coils of relay R$a$ to ground; also another circuit path, traced hereafter, through conductor 51. If the two distributers are in proper phase relation brush BR2 will be over one of the insulated divisions between the conductive segments of ring S2 at the instant of each completion of circuit through conductor 46 and through the coils of relay R$b$, and before brush BR2 can have passed on to one of the conductive segments of ring S2 relay R$b$ will have attracted its armature, so breaking the circuit path to ring RG2. But if, at the instant of completion of circuit by relay CL through the coils of relay R$b$, brush BR2 is still in contact with one of the conductive segments of ring S2 of distributer D2, (which may occur if the two distributers are not in exact proper phase relation) a circuit will be completed through conductor 48, the armature of relay R$b$, conductor 49, ring RG2, brush BR2, ring S2 and conductor 50 to conductor 51 and thence (see Fig. 1$^c$) to conductor 51 of that figure (being an extension of conductor 51 of Fig. 1$^b$) to brush M8, ring M7, conductor 52, contact stop 18, contact arm 16 (then in contact with contact stop 18) and conductor 53 to magnets M1 and M2 (connected in parallel to conductor 53) and thence through the coils of these two magnets to conductor 54 (to which conductor the two magnets are connected in parallel) and through ring M3 to brush M5 and thence to ground at 55.

Magnets M1 and M2 are very quick acting magnets and hence immediately upon the closing of the circuit just traced, the armature 15 of said magnets is attracted, causing pawl 14 to operate upon ratchet wheel 13 to step back distributer shaft DS so as to restore the brushes of distributer D2 to proper phase relation with the brushes of distributer D1. Relay R$a$ is a quick acting relay; relay R$b$ is a slow acting relay; for example, it may have, as indicated, a flexible armature which when in retracted position, is slightly sprung, so that relay R$b$ does not break the circuit through its rear contact point for an instant after the magnet of relay R$b$ is energized. Beside the circuit path from conductor 50 (Fig. 1$^b$) leading through conductor 51 to magnets M1 and M2 of the correction apparatus of Fig. 1$^c$, previously traced, there is another circuit path, in Fig. 1$^b$, from conductor 50 through conductor 56 and the magnet of relay R$a$ to ground. The magnet of relay R$a$ is therefore energized when magnets M1 and M2 (Fig. 1$^c$) are energized, and by the time these magnets M1 and M2 have begun to move their armature 15, and before relay R$b$ has broken the circuit through conductor 48, 49 and 50, leading to magnets M1 and M2 on the one hand and to the magnet of relay R$a$ on the other hand, this relay R$a$ has completed a circuit from ground through a source of current supply 57 and conductor 58 to conductor 58 of Fig. 1$^c$ (being a continuation of conductor 58 of Fig. 1$^b$) and brush M6, ring M4 and conductor 59 to contact arm 16 and thence through conductor 53, magnets M1 and M2, and conductor 54 to ground at 55; and at the same time has completed a branch circuit via contact arm 16, contact 18, conductor 52, brush M8, conductor 51, conductor 56 and thence through the magnet of relay R$a$ to ground, thus holding relay R$a$ and, consequently, magnets M1 and M2, in their energized condition; so that immediately after the closing through the contacts of relay R$b$ of a circuit through magnets M1 and M2 and the magnet of relay R$a$, causing one operation of the phase restoring mechanism, relay R$a$ closes another circuit path through its own magnet and these same magnets M1 and M2, in parallel, preventing deënergization of these magnets until this holding circuit is broken at 16—18 by the operation of the armature 15 of the correcting magnets M1 and M2; and when this holding circuit is broken at such contacts 16—18, the magnet of relay R$a$ is deënergized as are the magnets M1 and M2. The relay R$a$, in other words, acts to hold closed the circuit through the pawl magnets M1 and M2, until the pawl has completed its work of moving the ratchet wheel 13 one tooth.

When the armature 15 of magnets M1 and M2 is attracted and moved toward the poles of said magnets, it lifts links 20, causing nuts 22 on that link to raise contact arm 16 and so to break contact with contact stop 18; but owing to some play being provided between contact arm 16 and the nuts 22, contact is not broken between 16 and 18 until pawl 14 has moved ratchet wheel 13 through the space of one tooth. Once contact has been broken and rod 20 has raised lever 16 beyond the center of jockey 19, the jockey 19 forces contact arm 16 against stop 17. When magnets M1 and M2 are deënergized, the armature lever 15 is retracted by its retractile spring 15a, and the nut 21 on link 20, above contact arm 16, forces contact arm 16 downward past jockey 19 into contact with contact stop 18. Owing to "lost motion" between nut 21 and contact arm 16, said arm 16 is not forced downward past jockey 19 into contact with contact stop 18, until pawl 14 is in engagement with another tooth of the ratchet wheel 13. The contact 16—18, therefore, insures engagement of the pawl 14 with another tooth of the ratchet wheel before another stroke of the armature 15 begins, and so prevent back and forth vibration of the pawl 14 without change from one tooth of the ratchet wheel to another.

In circuit conductors 50 and 51, and in circuit with the magnet coils of relay Rb, we have indicated certain resistances R and R1 which serve to facilitate the timing of the action of relays Rb and Ra with reference to the action of magnets M1 and M2.

As previously stated, the magnets DM1 and DM2 which drive the phonic wheels PW of the LaCour motors of the two distributers, are alternately energized and deenergized by the operation of electrically driven tuning forks F; the driving magnets of these tuning forks being designated by reference character FM. The circuit through the magnet FM is alternately closed and opened at the contacts 60 and 61, of which 60 is a spring contact carried by one tine of the fork F, 61 being an adjustable screw. The other tine of the fork F carries a spring contact 63 playing between two adjustable contact screws 64 and 65, of which 64 is connected to the magnets DM1 of the LaCour motor, and 65 is connected to magnets DM2 of the LaCour motor. A source of electric energy 66 has one pole connected electrically to the base of the fork, the other pole of this source of electrical energy 66 being connected by conductor 69 to magnet FM, and being also connected through conductor 70 to magnets DM1 and DM2 in parallel; the complete circuit for these magnets DM1 and DM2 being from the source of energy 66 through conductors 69 and 70 and through magnets DM1 to conductor 71, and thence to contact screw 64; and from conductor 70 through conductor 72, and magnets DM2 to conductor 73 and thence to contact screw 65. It will be apparent that, as the fork F vibrates under the influence of magnet FM (alternately energized and deenergized in alternation, and at a rate corresponding to the fixed rate of vibration of the fork F) magnets DM1 and DM2 will be energized and deënergized alternately. The rate of vibration of the fork F is adjustable by means of weight masses 74, provided on the two tines of that fork, in the familiar manner; also, some adjustment of the rate of vibration of the fork F may be made, while the fork is in operation, by moving the screw 67 in or out, thus varying the point of engagement of the two buffer springs 68 with the tines of that fork.

To facilitate the bringing of distributers D1 and D2 into proper phase relation when starting up, we provide a hand-operated switch 75 (Fig. 1ª) and another hand operated switch 76 (Fig. 1ᵇ). In the drawings these switches 75 and 76 are shown in the positions occupied when the system is in full operation. When starting up these two switches are thrown to the opposite position. Switch 75 has two connected switch arms of which arm 75a is connected to the conductor 27 controlling the magnet TM of transmitter T2, while the contact point 75b corresponding with this contact arm 75a is connected by a conductor 77 to battery 30. The other arm, 75c, of switch 75, is connected to one of the contact segments of ring S3 corresponding to transmitter T2 (in the arrangement shown, to segment numbered 1); and normally this arm 75c is on contact point 75d connected to that contact tongue 23 of transmitter T2 to which the contact segments to which such switch arm 75c is connected. In other words, normally, the switch arm 75c is interposed in the circuit conductor (k1 in the arrangement shown) leading from one contact tongue 23 of transmitter T2 to the corresponding contact segment of ring S3. When the switch 75 is thrown to the right the arm 75c contacts with another contact point, 75e, connected to one pole of one of generators G1 and G2, viz:—to that pole from which those current pulses are derived which, during full operation of the system, effect motion of the armature of the main correcting relay CL from its normal position. It will be seen that when switch 75 is thrown to the right, a circuit is closed from generator G1 through switch arm 75c to segment 1 of ring S3 of distributer D1; the effect being the same as if transmitter T2 were operated so as to hold the circuit from generator G1 through transmitter contact K1 closed permanently; also, throwing of switch 75 to the right closes circuit from battery 30 through magnet TM of transmitter T2, and holds the circuit of that magnet closed so long as the switch 75 is in its abnormal position; thereby preventing operation of transmitter T2. For present purposes it may be assumed that, by prearrangement, transmitter T1 is not operated during the starting up period while distributers D1 and D2 are being brought into proper phase relation; though in practice the switch 75 is caused to prevent the operation of transmitter T1 just as it prevents the operation of transmitter T2; but the connections from switch 75 to transmitter T1 are omitted for the sake of simplicity. Similarly, it may be assumed, that, by prearrangement, transmitters T3 and T4 at the other end of the circuit are not operated during the starting up period, and while distributers D1 and D2 are being brought into proper phase relation; though it is a simple matter to provide means for preventing these transmitters from operating just as transmitter T2 is prevented from operating.

It will be observed that all but one of conductive segments of ring S2 of distributer D2 (Fig. 1$^b$) are normally connected through switch 76 to conductor 50; the one segment of ring S2 not so connected to conductor 50 through switch 76 being that conductive segment of ring S2 which corresponds to that segment 1 of ring S3 of distributer D1 (Fig. 1$^a$) to which switch arm 75$^c$ is permanently connected; and this one conductive segment of ring S2 of distributer D2 is permanently connected to conductor 50. When switch 76 is opened, the effect is to leave only one segment of the ring S2 of distributer D2 connected to conductor 50, that one segment of ring S2 being the segment corresponding to segment numbered 1 of the corresponding quadrant of ring S3 of distributer D1. In other words, by throwing switches 75 and 76 to what may be called the "starting position" each complete rotation of distributer D1 can effect only one current reversal in the main line circuit L, and this one current reversal can produce only one operation of correcting relay CL (Fig. 1$^b$) for each rotation of distributer D1; from which it follows that, during the starting up period, there will be no operation of the correcting apparatus of distributer D2 illustrated in Fig. 1$^c$, until, due to the different speeds at which distributers D1 and D2 are driven, brush BR2 of distributer D2 is in contact with that conductive segment of ring S2 which is permanently connected to conductor 50 at the instant when brush BR3 of distributer D1 is in contact with segment 1 of the corresponding quadrant of ring S3 of that distributer D1. In general, such simultaneous contacts in the two distributers will occur at a time when the two distributers are still not in perfect phase relation, and therefore such simultaneous contacts will cause the operation of the correcting apparatus of distributer D2 (Fig. 1$^c$) whereby the two distributers will be brought into more perfect phase relation. If the first operation of the correcting apparatus does not bring the two distributers into perfect phase relation, succeeding operations of that correcting apparatus, during succeeding rotations of the two distributers, will soon bring the two distributers into perfect phase relation, and thereupon the operator at the station shown in Fig. 1$^b$ may throw the switch 76 back to its normal position shown, and the operation of the transmitters T3 and T4 at that station may be begun; which operation will cause the operation of the selecting relays at the station indicated in Fig. 1$^a$, and thus will notify the operator at station 1$a$ that the two distributers are in proper phase relation and that switch 75 may be thrown back to its normal position shown; whereupon the operation of transmitters T1 and T2 may be started.

In practice, the transmitters connected to successive quadrants of the distributers effect their "marking signals" by currents of different polarities; that is to say, since transmitter T3 in Fig. 1$^b$ is connected to a quadrant of distributer D2 next succeeding, in its connection to the line circuit L, the quadrant of distributer D1 to which transmitter T2 is connected, the marking pulses of transmitter T3 will be positive pulses, whereas those of transmitter T2 are negative pulses. Similarly, the marking pulses of transmitter T1 and of transmitter T4 (the latter indicated but not shown) will be of opposite polarity. This insures at least three current reversals per revolution of the two distributers at the end of the starting up period, and after switch 76 has been thrown back to normal position, even though neither of the transmitters at the station shown in Fig. 1$^b$ be actually operated for the sending of messages immediately upon the throwing of switch 76 back to normal position; and three reversals in main line circuit L per revolution of the two distributers, well spaced apart, are, in general, quite sufficient to maintain the two distributers in proper phase relation; while after the throwing of the switch 75 back to normal position there are four reversals in main line circuit L during each rotation of the two distributors, such reversals being equally spaced apart, and being amply sufficient to maintain the two distributers in proper phase relation, even though none of the transmitters be operated.

Since, during the operation of the transmitters, each current reversal produced by the operation of those transmitters, affords an opportunity for the operation of the correction apparatus, if phase correction is required, the two distributers are maintained very perfectly indeed, in proper phase relation during the full operation of the apparatus.

In Figs. 1$^a$, 1$^b$ and 1$^c$ we have illustrated a system wherein, although each distributer has four quadrants, only two of these quadrants are utilized for transmission in one direction, the other two quadrants being utilized for transmission in the opposite direction; in other words, there are four channels of communication. We have selected this arrangement of apparatus as being the arrangement which permits illustration of our correction method and apparatus most simply in a system wherein provision is made for simultaneous transmission in both directions. However, in practice we prefer to utilize all quadrants of each distributer for transmission, in which case, with the distributers constructed as shown, there would be four transmitters for each distributer, simultaneous transmission being effected in both directions by use in the line circuit of any of the well known systems of duplex telegraphy, for example, the Stearnes duplex, or the Wheatstone bridge duplex, thus giving eight channels of communication. It is well known that the Baudot system may be duplexed by well known duplexing methods, and of course the same is true of the modification of the Baudot system comprised in our invention. Also, it will be understood that the distributers, instead of being divided in the quadrants, for the operation of four transmitters at each end of the line, may be divided for the operation of a greater or a less number of transmitters at each end of the line; this being a well known characteristic of Baudot systems.

It is possible, according to our system, to have the signaling impulses vary in strength as well as in direction, without any interference with maintenance of synchronism. Thereby it becomes possible, by applications of well known principles of multiplex telegraphy to greatly increase the number of transmitters per line. This is illustrated in Fig. 5, which shows distributers D1a and D2a (which are entirely similar to the distributers D1 and D2 of Figs. 1a and 1b, except in the one respect hereinafter noted) and shows two transmitters T1a and T2a both connected to the same quadrant of ring S3 of distributer D1a. For simplicity, in Fig. 5 we have shown the circuits arranged for transmission only from distributer D1a to distributer D2a; that is to say, we have indicated transmitters connected to distributer D1a only, and have indicated receiving apparatus connected to distributer D2a only; also for the sake of simplicity in illustration, we have indicated only one of the quadrants of distributer D1a as used for transmission, and have indicated only one quadrant of distributer D2a as used for reception. It will be understood, however, that a further group of two transmitters may be connected to a further quadrant of distributer D1a, and a further group of two sets of selecting relays R1—R5 inclusive, may be connected to a further quadrant of distributer D2a; the circuits being a mere duplication of the circuits already shown in Fig. 5; also as previously explained with reference to Figs. 1a, 1b, and 1c, transmitting and receiving sets may be connected to all of the quadrants of each distributer, simultaneous transmission in both directions over the line wire L being effected through one of the well known systems of duplex telegraphy.

Transmitter T2a in Fig. 5 may be understood to be in all respects similar to transmitter T2 of Fig. 1a; and the contact tongues 23 of transmitter T2a are connected to corresponding conductive segments of ring S3 of distributer D1a, by circuit conductors k1, k2—k5; in which circuit conductors, however, certain resistances k1a—k5a are interposed for a reason hereinafter stated. Transmitter T1a is also similar to the other transmitter, except that its contact stops 25 and 26 are not directly connected to generators, rear contact stops 25 being connected through leak conductors k1b—k5b and leak resistances k1c—k5c to ground, and rear contact stops 26 being connected to conductor k1—k5 inclusive in advance of resistances k1a—k5a; while contact tongues 23 of transmitter T1a are connected to conductors k1—k5 beyond resistances k1a—k5a. It will be seen that in Fig. 5 the transmitters T2a and T1a are connected in parallel to the corresponding quadrant of ring S3; that when all of the transmitting contacts of transmitter T1a are in the position shown (the position for "spacing" impulses) the current impulses transmitted from either generator G1 or G2 are weakened by passage through resistances k1a—k3a, and by diversion or leakage of current to ground through resistances k1c—k5c; but that when any contact of transmitter T1a is operated for a marking impulse, the corresponding resistance of series k1a—k5a is cut out, and the circuit to the corresponding leak is interrupted, so that the current impulse from the generator G1 is transmitted to and through the line without reduction in strength at transmitter T1a. In a word, transmitter T2a operates to reverse polarity in the line, and transmitter T1a operates to vary the strength of the current impulses in the line. It will be recognized that the two transmitters T2a and T1a operate just as do the two transmitters at one end of an ordinary quadruplex telegraph line. While we have shown the transmitter T1a as operating to vary the strength of the line impulses by control of resistances and leaks, it will be obvious that other well known means for causing the "neutral" or "non-polar" transmitter to vary the strength of the line impulses may be employed, as in ordinary quadruplex telegraphy; the leak arrangement shown being simply one of many familiar methods for varying line current strength which is applicable to this system, and which is easy of comprehension and of illustration.

(It may be explained here that in this specification, for convenience, we have in several instances used the terms "marking impulse" and "spacing impulse" as such terms are used in telegraphy generally, with reference to the impulses transmitted through the various transmitter contacts, although in this system as ordinarily employed, the so-called "marking" current impulses affect selecting relays of the series R1—R5 at the receiving end of the line, instead of operating a sounder or register or recording as in ordinary telegraphy).

The two distributers of Fig. 5 differ from the two distributers of Figs. 1ᵃ and 1ᵇ in that, for reception of signals from the two transmitters operating through the same quadrant of the transmitting distributer, two sets of receiving rings are provided in the receiving distributer. In the arrangement of circuits shown, the current impulses from the current reversing transmitter T2a, influence the main line polar relay ML, which relay in turn controls the upper series of selecting relays R1—R5 through distributer rings RG1 and S1, in the manner already described with reference to Figs. 1ᵃ and 1ᵇ. The variations in current strength produced by the operation of the non-polar transmitter T1a operate a line neutral or non-polar relay MLa, which latter relay controls the second series of selecting relays R1a—R5a through distributer rings RG1a and S1a, in the same manner; and the rings RG1a and S1a are entirely similar to the rings RG1 and S1.

From a consideration of Fig. 5 it will be apparent that, by application of well known principles of multiplex telegraphy, three or even a greater number of transmitters may be operated through each quadrant or major division of each distributer; for since Fig. 5 merely illustrates the application of quadruplex telegraphy, to a synchronous telegraph system such as ours, it is equally obvious that by the application of well known methods of sextuplex telegraphy, three transmitters could be operated through each quadrant or major division of each distributer, and by application of well known principles of octuplex telegraphy, four transmitters could be operated through each quadrant or major division of each distributer; and so on.

In the arrangement shown in Fig. 5, maintenance of synchronism is effected by the control by the main correcting relay CL, of the same circuits and apparatus which are illustrated for that purpose in Figs. 1ᵇ and 1ᶜ. We have thought it necessary to illustrate, in Fig. 5, such circuits and instruments, only so far as they are illustrated in Fig. 1ᵇ; and it may be understood that Fig. 1ᶜ is a continuation of Fig. 5 in the same sense that said Fig. 1ᶜ is a continuation of Fig. 1ᵇ. It will be obvious that the operation of transmitter T1a and the corresponding main line relay MLa does not interfere in the slightest with the operation of relay CL and the circuits and instruments controlled thereby for maintaining synchronism. We have not thought it necessary, in Fig. 5, to illustrate the circuits and switches illustrated in Fig. 1ᵃ and Fig. 1ᵇ for use in bringing the two distributers into proper phase relation when first starting up. It will be understood that the same circuits and switches, illustrated for this purpose in Figs. 1ᵃ and 1ᵇ, may be provided in the arrangement shown in Fig. 5.

We have heretofore spoken of the correction, required for maintenance of synchronism and phase relation, as being effected by current reversal; each current reversal in the main line affording an opportunity for correction, if correction is required. However, our invention is somewhat broader than this, in that, in our system, each change from a spacing to a marking impulse, or from a marking to a spacing impulse, affords an opportunity for correction, whether there be a change of line polarity or not. In Fig. 6 we have illustrated a system wherein two neutral or non-polar transmitters T1b and and T2b are employed; the system operating by current impulses of one direction only from each transmitter (and, in the arrangement shown, by current impulses of the same direction from each transmitter, though the direction of current impulses from the one transmitter might be different from that of the current impulses from the other transmitter, without change in operation of the system). The two transmitters are connected to different quadrants of distributer D1 and the two banks of receiving relays R1—R5 inclusive are connected to different quadrants of distributer D2. For simplicity we have indicated circuits and instruments for transmission in one direction only, and from two quadrants only of distributer D1; but, as previously explained, there may be transmission from all quadrant or major divisions of each distributer, by application of well known principles of duplex telegraphy. Current is supplied for transmission of signals by a generator (shown in this instance as a battery) G; and since the currents are all of one direction, the two transmitters T1b—T2b do not require rear contact stops 25, such as the transmitters of the previous figure, have been shown as provided with. Signals from the two transmitters are received by a non-polar main line relay MLb and are repeated thereby to ring RG1 of distributer D2, and thence are distributed to the selecting relays R1—R5 just as above described with reference to Fig. 1ᵇ. A non-polar correcting relay CLb is connected in series in the main line circuit with relay MLb and effects correction in phase in the same manner as does correcting relay CL of Fig. 1ᵇ; Fig. 1ᶜ being a continuation of this Fig. 6 in the same sense that it is a continuation of Fig. 1ᵇ. From what has been said before, the operation of the circuits and instruments shown in Fig. 6 will be obvious.

In Figs. 7–12 inclusive, we illustrate other means of applying the basic idea involved in our invention, viz:—causing each change from a spacing to a marking impulse, or from a marking to a spacing impulse, (i. e., in systems operating by current reversal, causing each current reversal,) to afford an opportunity for correction.

In Figs. 7–11 inclusive, for simplicity we have omitted the transmitting instruments, including the transmitting distributer, and have shown only the receiving distributer and other receiving instruments, and that receiving distributer is shown as provided only with divisions for the control of one receiving apparatus. It may be understood that the representations of the receiving distributer, in Figs. 7–11 represent only one quadrant or major division of that distributer. From the preceding figures it is clearly apparent that the receiving distributers shown in Figs. 7–11 may comprise more than one major division and so may be adapted for more than one set of receiving apparatus.

In Figs. 1–6 inclusive correction of phase is accomplished by stepping backward the receiving distributer, which distributer is normally driven at a speed slightly in excess of that of the transmitting distributer. In certain of Figs. 7–12 inclusive we indicate means for effecting correction by either retardation or acceleration of the receiving distributer, as may be required.

Referring now to Fig. 7: As in the previous views, ML designates the main line receiving relay which in this instance is shown as a polar relay. There are two correcting relays CL′ and CL″ which in the arrangement shown are both non-polar delay action relays, one or the other being operated according as the armature of relay ML makes contact with its upper or lower stop. Relay ML controls the selecting relays R1—R5 inclusive, through distributer rings RG1 and S1, as in the preceding figures. Supposing a current pulse in the line wire L to reverse the position of the armature of relay ML, the magnet of correcting relay CL′ will be energized, but, since this relay is a delay action relay, before the contact spring 78 has broken contact with the rear stop 79, a circuit will have been completed from main battery LB through conductor 80, the armature and upper stop of relay ML conductor 81, armature contact spring 78, rear stop 79, and conductor 82 through one winding of the differential polar relay R6, conductor 83 and the main return conductor 84 back to battery. This current impulse, in passing through relay R6, moves the armature of that relay to the left, thereby completing another circuit from battery LB through conductor 85, the armature of relay R6, and conductor 86 to distributer ring RG2 and thence, through brushes BR2 to one or another of the alternated segments R and A of ring S2. If the brush BR2 is in contact with one of segments A the circuit will then continue through conductor 87, switch 88 and conductor 89, the magnet of relay CL3 and back to the opposite pole of battery LB. Should brush BR2 be in contact with an R segment of ring S2 at the instant, the circuit will be, instead, through conductor 90, switch 88, conductor 91 and the magnet of relay CL4, back to the opposite pole of battery LB. It will be seen that the circuit path from ring S2 is to relay CL3 or relay CL4 according as the brush BR2 is in contact with an A (advance) segment, of ring S2, or with an R (retard) segment of ring S2; and if, (as will be the case, if the distributer is in perfect phase relation with the distributer at the transmitting end of the line) the brush BR2 is over one of the insulating divisions between an A segment and an R segment of ring S2 at the instant of actuation of relays CL′ and R6, no circuit will be completed to either relay CL3 or CL4. The circuit through the armature of relay CL′ to one magnet coil of relay R6 continues for an instant only, as the armature 78 of that relay CL′ almost immediately breaks contact between spring 78 and stop 79, whereupon the armature of relay R6 is drawn back to the position shown in Fig. 7, by the relatively weak holding coil 92 of that relay, to which coil current is supplied from battery LB through conductors 85, 83 and 84.

Upon the return of the armature of relay ML to its lower stop, a circuit is completed through the magnet of relay CL″ and also, for an instant, through the armature spring 78 of that relay, the back stop 79 of that relay, and conductor 93 and through the stronger of the coils of polar relay R7 back to battery; and thereby a circuit is completed from battery LB through conductor 85, the armature of relay R7, and conductor 86 and thence through RG2, brush BR2 and one of the A or R segments of ring S2 to one of the relays CL3 or CL4, and thence back to batttery; or, should brush BR2 be on one of the insulation divisions of ring S2 at the moment of actuation of relays CL2 and R7, neither relay CL3 or relay CL4 will be actuated. It will be seen that whether relay CL' or relay CL'' is actuated, depends simply upon whether the armature of relay ML moves in the one direction or the other; that relay CL'' controls relay R7 just as relay CL' controls relay R6; and that when either relay R6 or R7 is actuated to close circuit to ring RG2, circuit is completed to relay CL3 or relay CL4, according as brush BR2 is in contact at the moment with an A segment or an R segment of ring S2; while if brush BR2 is on an insulation division of that ring S2 neither relay CL3 or relay CL4 will be actuated.

A2 designates an electric motor driving distributer D2. When the magnet of relay CL3 is energized, that relay opens a shunt circuit 94—95 around a resistance RS2 in series with the field F2 of the motor A2; and the field resistance of the motor being thereby increased, the speed of the motor A2 is increased. When the magnet of relay CL4 is energized that relay breaks the shunt 96—97 around resistance RS1 in series with the armature of motor A2; the breaking of which shunt 96—97 throws resistance RS1 in series with the armature, thereby decreasing the speed of the motor A2. It will be obvious that control of the resistances RS2 and RS1 by relays CL3 and CL4, themselves controlled in the manner described, will keep distributer D2 in synchronism with the distributer at the transmitting end of the line.

Switch 88 is employed for the same purpose as switch 76 in Fig. 1b. It is to be understood that, when first starting up, motor A2 will drive distributer D2 at a speed slightly in advance of the speed of the distributer at the transmitting end of the line. Switch 88 when thrown to the right or starting position, disconnects all of the A segments of ring S2 from conductor 89, and connects one R segment only of distributer S2 to conductor 91. It will be understood that at the transmitting end means, such as the switch 75 of Fig. 1a, is employed to cause the transmitting distributer to send a current impulse through the line once only in each rotation of that distributer. The receiving distributer D2 being driven at a speed slightly greater than that of the transmitting distributer, it will soon happen that when the transmitting distributer is sending its current impulse, brush BR2 of the receiving distributer D2 will be in contact with that particular R segment of ring S2 then in circuit, and thereupon relay CL4 will be operated to retard the speed of the motor A2; so bringing the two distributers into proper phase relation and synchronism as to speed.

The synchronizing arrangement shown in Fig. 8 is similar to that shown in Fig. 7, except that the distributer D2 is driven by a LaCour wheel PW, the magnets DM1 and DM2 of which are alternately energized and deënergized by the action of an electrically driven tuning fork F. Relay CL3 controls a shunt around resistance RS3 in the circuit of the driving magnet FM of fork F, and when the magnet of relay CL3 is energized the shunt around this resistance RS3 is opened, the resistance RS3 being thereby placed effectively in circuit with magnet FM, thereby increasing the speed of the fork F. Relay CL4 operates a ratchet mechanism similar to that illustrated in Fig. 1c, whereby, when the magnet of relay CL4 is energized, the circuit of the ratchet magnet M1 is closed and the ratchet mechanism operated, as described with reference to Fig. 1c, to step the distributer D2 backward slightly.

The arrangements shown in Figs. 7 and 8 form the subject matter of a divisional application filed August 21, 1915, Serial No. 46,641.

In the arrangement shown in Fig. 9, (which in general is similar to that shown in Fig. 7, except in the respects hereinafter noted), the main line relay ML, instead of controlling delay action relays CL' and CL'', as in Fig. 7, controls a relay CL''', the armature and two contact points of which control a leak connection 98 from battery LB. When the armature of relay CL''' is in contact with either of its stops, current is led off through this leak connection to such extent that neither of relays CL3 and CL4 will be operated. But when the armature of relay ML is moved from one stop to the other, the armature of relay CL''' will be moved correspondingly from one stop to the other, and during such movement the leak 98 is broken, and if the brush BR2 be on either an A segment or an R segment of distributer D2, at that instant, one or the other of relays CL3 and CL4 will be actuated, so controlling the speed of the motor A2 driving the distributer D2.

The arrangement shown in Fig. 10 is similar to that shown in Fig. 9, except that the distributer D2 is here shown as arranged to be driven by a LaCour wheel PW and electrically driven tuning fork F, the speed of the distributer being increased, or the distributer being stepped back, as required for maintenance of proper phase relation, by means such as shown in Fig. 8.

In Figs. 7, 8, 9 and 10 we have shown correction means whereby the speed of the receiving distributer is increased or that distributer is stepped back as may be required for maintenance of proper phase relation. In Figs. 1a, 1b and 1c, however, we showed that if the corrected distributer be arranged to run normally at a speed different from that of the correcting distributer, correction in one sense only (in that case, correction by retardation or stepping back) is all that is necessary. In Fig. 11 we show another arrangement whereby correction in one sense only is effected; i. e., in the arrangement shown, correction by retardation or stepping back; the correction being effected, however, by means of current reversal in a local correction circuit controlled by the main line relay. The main line relay ML controls through distributer ring RG2 and brush BR2 and the A segments of ring S2, a relay R''''; while from the R segments of ring S2 a circuit conductor 99 leads to a condenser K connected to the armature of relay R''''. The two contact stops of relay R'''' are connected, the one to one magnet and the other to another magnet of a polar relay Rx, and thence to ground. The armature of relay Rx is connected to a generator 100 and thence to ground, while one contact stop of relay Rx is connected to the magnet M1 of the ratchet mechanism previously described.

It will be noted that in the arrangement shown in this Fig. 11 the contact stops of the main line relay ML are connected, the one to a source of current of one polarity, the other to a source of current of the opposite polarity. The polarity of the armature of relay R'''' is such that a current impulse from battery 103 passing through the armature of relay ML, ring RG2, brush BR2 and any of the A segments of ring S2, to the magnet coils of relay R'''', moves the armature of that relay into contact with the contact stop 105, while a current impulse from battery 104, passing through the armature of relay ML and the same circuit path to and through the magnet coils of relay R'''' moves the armature of that relay into contact with contact stop 106.

The relay Rx is operated by battery 103 and 104 through the armature of main line relay ML, conductor 101, ring RG2, brush BR2 and any of the R segments of ring S2, condenser K, armature of relay R'''' and one or the other of the contact stops of that relay, to one or the other of the magnet coils of relay Rx. If the armature of relay R'''' is against contact stop 105 when the condenser K receives a charge from battery 103 through one of the R segments, the resulting current flow through the upper magnet coil of relay Rx actuates the armature of that relay to move such armature against stop 107. If, however, the armature of relay R'''' is in contact with its stop 106 the charging of the condenser K as described will energize the lower coil of relay Rx and move the armature of that relay into contact with stop 108. The magnet M1 of the ratchet mechanism is energized only when contact is made between the armature of relay Rx and stop 108.

In describing the operation of this Fig. 11 arrangement we will first assume that the brushes of the distributers at the two ends of the line wire L are rotating in synchronism and in proper phase relation. When this condition exists the brush BR2 will be just entering upon the beginning or left extremity of an A segment as the armature of main line relay ML changes from one position to the other in response to a signaling impulse transmitted through line wire L.

We will assume that the armature of relay ML has just moved to the right, and that brush BR2 is just entering an A segment of ring S2. As the brush moves over the A segment a circuit is established from battery 103 through the armature of relay ML, conductor 101, ring RG2, brush BR2, an A segment of ring S2 and the coils of relay R'''', to ground, moving the armature of relay R'''' into contact with contact stop 105. This prepares a circuit path for the following operation. The brush BR2 continues to move over the A segment of ring S2 and on to the next succeeding R segment of that ring. The armature of relay ML being still against its right hand stop and so in circuit with battery 103, when brush BR2 makes contact with such succeeding R segment, a circuit is completed from battery 103 through the armature of relay ML and conductor 101 to ring RG2 as before, brush BR2, and the R segment of ring S2 to one side of the condenser K, the other side of that condenser being connected through the armature of relay R'''' stop 105 and upper coil of magnet Rx to ground, thereby holding the armature of relay Rx against its upper stop 107, so preventing any action of magnet M1; which is as it should be, for under the conditions assumed, the distributers at the two ends of the line are in perfect phase relation, and no correction by the operation of magnet M1 is required.

But let us now suppose that the distributers at the two ends of the line are not in perfect phase relation; and that, at the moment the armature of main line relay ML moves to the right to establish circuit connection with battery 103, the brush BR2 instead of just entering an A segment as previously assumed, has advanced along an A segment until it is about to leave that segment. In such case the contact of brush BR2 with such a segment, following the closing of connection between the armature of relay ML and battery 103, will be too brief to permit reversal of the armature of relay R'''', which armature, therefore, (having previously been against its stop 106 owing to a previous transmission of an impulse from battery 104 through the coils of relay R'''') will remain in contact with stop 106; and when the brush BR2 passes on into contact with the next R segment, the condenser K will be charged from battery 103, and the lower coil of relay Rx will be energized and therefore the armature of that relay will be moved against its stop 108, causing the energization of magnet M1 and the operation of the ratchet mechanism to retard or step back the distributer D2; whereby that distributer is restored to proper phase relation with the distributer at the other end of the line.

At the next change of polarity in main line L the armature of the main line relay ML moves into connection with battery 104; but as the distributer D2 has been stepped back to bring it into proper phase relation with the distributer at the other end of the line, the brush BR2 remains in contact with an A segment of ring S2 for a sufficient length of time for relay R'''' to be operated; though no operation of that relay R'''' occurs, because, although the current from battery 104 tends to move the armature of relay R'''' into contact with stop 106, that armature is already in contact with that stop 106, not having been moved from that stop 106 by the previous impulse from battery 103, since during such previous impulse contact of the brush BR2 with an A segment continued for too brief a time for relay R'''' to operate. When the brush BR2 passes to the next succeeding R segment, a current impulse from battery 104 charges the condenser K and the resulting flow of current moves the armature of relay R.c into contact with its stop 107, thereby breaking the circuit through the ratchet magnet M1 and permitting the restoration of the armature and pawl of that magnet to normal. The next reversal of current in line wire L moves the armature of relay ML into connection with battery 103 and just as the brush BR2 passes over into contact with the next A segment a current impulse from battery 103 passes through the coils of relay R'''' for a sufficient time to move the armature of that relay against its stop 105, so that when the brush BR2 reaches the following R segment of ring S2 the latter portion of the current impulse from battery 103, charging the condenser K, does not change the position of the armature of relay R.c, which is still held against stop 107.

In other words, if the reversing relay R'''' is actuated by the first portion of an impulse, transmitted through the armature of the main line relay ML, whether that impulse be positive or negative, the correcting relay R.c is not actuated by the second portion of that impulse; but if the reversing relay R'''' is not actuated by the first portion of an impulse, by reason of such first portion being too short, then the correcting relay R.c is actuated, magnet M1 is energized, and correction of the distributer effected.

In the arrangement shown in Fig. 11 the selecting relays R1—R5 inclusive are operated by polar relays r1—r5, connected each to a corresponding segment of distributer ring S1.

The arrangement shown in Fig. 11 forms the subject matter of a divisional application filed August 21, 1915, Serial No. 46,642, now Patent No. 1,191,933, dated July 18, 1916.

In Figs. 12–15 inclusive, we illustrate the application of our improved means for correction to the well known Baudot correction apparatus wherein a magnet, when energized, pushes a pin into the path of a tooth of a star wheel mounted upon a rotating member of the mechanism driving the distributer brushes, whereby such distributer brushes are stepped back. Referring first to Figs. 13 and 14, which figures illustrate, more or less schematically, the well known correcting mechanism referred to. Since this correcting mechanism is well known we will only describe it briefly.

Numerals 109 and 110 designate two spur gears (109 being, preferably, a spiral gear) secured together by a screw 111, and mounted upon the same shaft 112, so that they rotate together. These gears are, however, loose with respect to shaft 112. 113 designates a motor driven gear which drives gear 109 and so drives the other mechanism to be described hereinafter. Upon shaft 112 is a disk 114, secured to said shaft to rotate therewith. In this disk 114 is mounted a hollow shaft 115; and within such hollow shaft is mounted a shaft 116, the latter carrying a pinion 117 in mesh with gear 110; while shaft 115 carries a pinion 118 the diameter of which is greater than that of pinion 117, pinion 118 being in mesh with a third and smaller pinion 119 itself mounted upon a shaft 120 having bearings in the disk 114; a star wheel 121 being mounted upon the same shaft 120. There is a frictional connection 122 between shaft 116 and pinion 118; i. e., between shaft 116 and shaft 115. A jockey 123 (Fig. 14) carried by the disk 114, normally engages teeth of the star wheel 121 and tends to prevent rotation of that star wheel with reference to the disk 114; though as will be readily understood this jockey will yield to force tending to rotate the star wheel with reference to the disk 114.

It will be seen that, with the mechanism as so far described in operation, rotation of gear 109 transmitted by gear 110 to pinion 117 and thence by shaft 116 and frictional connection 122, to pinion 118, transmitted thence to pinion 119, will cause rotation of disk 114; rotation of star wheel 121 with reference to disk 114, being prevented by the jockey 123, so that the gearing is locked; and disk 114 being drivingly connected to shaft 112, it follows that shaft 112 will be rotated. This shaft 112 in practice carries the brushes of the distributer.

An electromagnet 124 is mounted, with its armature 125 in such position with reference to the star wheel, that when such magnet is energized and its armature attracted, a projection 126 of such armature pushes a pin 127 forward into position to engage a tooth of the star wheel 121 and retard that star wheel during its rotation with disk 114 about the axis of shaft 112. The effect of such engagement is to rotate the star wheel backward through the space of one tooth, and thereby to retard the brushes on shaft 112 with reference to the gear 109. Immediately after such retardation occurs, the pin 127 is restored to the position shown in Fig. 13 by a cam 128 carried by disk 114 (the circuit of magnet 124 having previously been broken by other means as hereinafter described).

Referring now to Fig. 12: In Fig. 13 we have shown only one correcting magnet 124; but it will be obvious that there may be a plurality of such magnets 124 spaced angularly about the shaft 112 and each arranged, when energized, to thrust forward a corresponding pin 127. In Fig. 12 we show four such magnets, 124a, 124b, 124c, and 124d, which will be understood to be properly spaced angularly about shaft 112 of Fig. 13, each such magnet having an armature 125 arranged to actuate a corresponding stop pin 127a, 127b, 127c and 127d. These magnets are controlled by an auxiliary commutator CM, which may be understood to constitute additional rings of one of the distributers illustrated in previous views; and such commutator is provided with the brushes CBR carried by the brush shaft of the distributer (i. e., in Fig. 13, the shaft 112) but insulated from such shaft. These brushes CBR therefore rotate with the main brushes BR1, BR2, BR3 and BR4 of the distributer (such brushes BR1—BR4 not being shown in Fig. 12, but being shown in numerous of the preceding figures); and brushes CBR in their rotation successively connect commutator segments SG1, SG2, SG3 and SG4 with ring Z. Ring SG1 is connected to magnet 124a and thence through a conductor 129 to battery 130 and contacts 131 of a correction relay 132 and thence to ring Z of the commutator CM (the magnet of which relay 132 may be understood to be substituted for the magnets M1 and M2 of Fig. 1c, or to be in a circuit controlled in the same manner as the magnet of relay CL4 in Fig. 7 or the magnet of relay CL4 in Fig. 8, or Fig. 9, or Fig. 10). Each time the correcting relay 132 is actuated its armature is attracted, closing the circuit of battery 130 through contact 131 through ring Z and brushes CBR to the particular segment of series 124 with which those brushes are in contact at the instant, and thence through the corresponding magnet of series 124 back to battery; in this way one of the magnets of series 124 will be energized and will advance the corresponding pin of series 127 into position to engage the star wheel. As soon as brushes CBR leave the commutator segment to which such magnet of series 124 is connected, that magnet is deënergized and its corresponding pin 127 is thereafter restored by the cam 128.

In Fig. 12, four pins 127 are indicated with means for operating them; the arrangement shown in Fig. 12 therefore providing four opportunities for correction during each rotation of the distributer; but it will be obvious that the number of pins 127 and operating means therefor, may be greater or less, as desired.

What we claim is:

1. In a telegraph system, the combination of two rotary distributers, means for driving the same, means for transmitting current impulses from the one distributer to the other, and for varying such impulses, according to combinations of a code having an odd number of impulses for each character, for the transmission of signals, and means for maintaining synchronism between said distributers, comprising correction mechanism arranged to restore proper phase relation between said distributers, and to be brought into operation immediately to that end by any variation of such impulses from the normal occasioned by the transmission of a code character, if the two distributers are not in proper phase relation when such variation occurs.

2. In a telegraph system, the combination of two rotary distributers, means for driving the same, means for transmitting current impulses from the one distributer to the other, and for varying the direction of such impulses, according to the combinations of a code having an odd number of impulses for each character, all of the impulses from any one transmitting means being of the same direction except as the direction of one or more of the impulses of any one character-group may be changed in direction to cause such character-group to correspond to a code-character, and means for maintaining synchronism between said distributers, comprising correction mechanism arranged to restore proper phase relation between said distributers, and to be brought into operation immediately to that end by such current reversals, incident to the transmission of code characters, if the two distributers are not in proper phase relation when such a reversal occurs.

3. In a telegraph system, the combination of two rotary distributers, means for driving the same, means for transmitting current impulses from the one distributer to the other, and for varying such impulses according to combinations of a code having an odd number of impulses for each character, for the transmission of signals, and means for maintaining synchronism between said distributers, comprising clock hand correction mechanism arranged to restore proper phase relation between said distributers, and to be brought into operation immediately to that end by any variation of such impulses from the normal occasioned by the transmission of a code character, if the two distributers are not in proper phase relation when such variation occurs.

4. In a telegraph system, the combination of two rotary distributers, means for driving the same, means for transmitting current impulses from the one distributer to the other, and for varying the direction of such impulses according to the combinations of a code having an odd number of impulses for each character, all of the impulses from any one transmitting means being of the same direction except as the direction of one or more of the impulses of any one character-group may be changed in direction to cause such character-group to correspond to a code-character, and means for maintaining synchronism between said distributers, comprising clock hand correction mechanism arranged to restore proper phase relation between said distributers, and to be brought into operation immediately to that end by such current reversals, incident to the transmission of code characters, if the two distributers are not in proper phase relation when such a reversal occurs.

5. In a telegraph system, the combination of two rotary distributers, means for driving the same, means for transmitting current impulses from the one distributer to the other, and for varying the direction of such impulses according to the combinations of a code, all of the impulses from any one transmitting means being of the same direction except as the direction of one or more of the impulses of any one character-group may be changed in direction to cause such character-group to correspond to a code-character, and means for maintaining synchronism between said distributers, comprising clock hand correction mechanism and controlling means therefor comprising a correcting relay operated by said current reversals and arranged by its operation to cause immediate operation of such correction mechanism, if occasion for correction exists.

6. The combination of two rotary devices, means for driving the same, and electric means for maintaining synchronism between said rotary devices, comprising means for transmitting electric current from one such rotating device to the other and for varying such current for the transmission of signals, correcting mechanism adapted for restoring proper phase relation between said rotating devices, and comprising an operating magnet, one of said rotary devices comprising a commutator having segments, a plurality of which are conductive and are electrically connected, and are separated from one another by intermediate segments electrically insulated from the said connected segments, a brush for such commutator, a circuit for such brush and commutator to which are applied current impulses corresponding to the signal-transmitting current variations, and controlling means for said correcting mechanism also included in said commutator circuit and arranged to be operated immediately and in turn to energize said operating magnet to cause such correcting mechanism to operate immediately, when said brush is on one of said connected commutator segments at a time when a current impulse is applied to such commutator segment as aforesaid.

7. The combination of two rotary devices, means for driving the same, and electric means for maintaining synchronism between said rotary devices, comprising means for transmitting electric current from one such rotating device to the other and for varying such current for the transmission of signals, correcting mechanism adapted for restoring proper phase relation between said rotating devices, and comprising an operating magnet, one of said rotary devices comprising a commutator having segments, a plurality of which are conductive and are electrically connected, and are separated from one another by intermediate segments electrically insulated from the said connected segments, a brush for such commutator, the number of the said segments of such commutator being such that the brush passes at least one of the connected segments and one of the intermediate segments for each such signal-transmitting current variations, a circuit for such brush and commutator to which are applied current impulses corresponding to the signal-transmitting current variations, and controlling means for said correcting mechanism also included in said commutator circuit and arranged to be operated immediately and in turn to energize said operating magnet to cause such correcting mechanism to operate immediately, when said brush is on one of said connected commutator segments at a time when a current impulse is applied to such commutator segment as aforesaid.

8. The combination of two rotary devices, means for driving the same, and electric means for maintaining synchronism between said rotary devices, comprising means for transmitting electric current from one such rotating device to the other and for varying such current for the transmission of signals, correcting mechanism adapted for restoring proper phase relation between said rotating devices, and comprising an operating magnet, one of said rotary devices comprising a commutator having segments, a plurality of which are conductive and are electrically connected, and are separated from one another by intermediate segments electrically insulated from the said connected segments, a brush for such commutator, a circuit for such brush and commutator to which are applied current impulses corresponding to the signal-transmitting current variations, and controlling means for said correcting mechanism also included in said commutator circuit and arranged to be operated immediately and in turn to energize said operating magnet to cause such correcting mechanism to operate immediately, when said brush is on one of said connected commutator segments at a time when a current impulse is applied to such commutator circuit as aforesaid, and means for limiting, to a fraction of the duration of the corresponding current variation, the period of application of current to such commutator circuit.

9. The combination of two rotary devices, means for driving the same, and electric means for maintaining synchronism between said rotary devices, comprising means for transmitting electric current from one such rotating device to the other and for varying such current for the transmission of signals, correcting mechanism adapted for restoring proper phase relation between said rotating devices, and comprising an operating magnet, one of said rotary devices comprising a commutator having segments, a plurality of which are conductive and are electrically connected, and are separated from one another by intermediate segments electrically insulated from the said connected segments, a brush for such commutator, a circuit for such brush and commutator to which are applied current impulses corresponding to the signal-transmitting current variations, and controlling means for said correcting mechanism also included in said commutator circuit and arranged to be operated immediately and in turn to energize said operating magnet to cause such correcting mechanism to operate immediately, when said brush is on one of said connected commutator segments at a time when a current impulse is applied to such commutator circuit as aforesaid, and a relay arranged to limit, to a fraction of the duration of the corresponding current variation, the period of application of current to such commutator circuit.

10. The combination of two rotary devices, means for driving the same, and electric means for maintaining synchronism between said rotary devices, comprising means for transmitting electric current from one such rotating device to the other and for varying such current for the transmission of signals, correcting mechanism adapted for restoring proper phase relation between said rotating devices, and comprising an operating magnet, one of said rotary devices comprising a commutator having segments, a plurality of which are conductive and are electrically connected, and are separated from one another by intermediate segments electrically insulated from the said connected segments, a brush for such commutator, a circuit for such brush and commutator to which are applied current impulses corresponding to the signal-transmitting current variations, and controlling means for said correcting mechanism also included in said commutator circuit and arranged to be operated immediately and in turn to energize said operating magnet to cause such correcting mechanism to operate immediately, when said brush is on one of said connected commutator segments at a time when a current impulse is applied to such commutator circuit as aforesaid, and a relay in such commutator circuit and arranged to limit, to a fraction of the duration of the corresponding current variation, the period of application of current to such commutator circuit.

11. The combination of two rotary devices, means for driving the same, and electric means for maintaining synchronism between said rotary devices, comprising means for transmitting electric current from one such rotating device to the other and for varying such current for the transmission of signals, correcting mechanism adapted for restoring proper phase relation between said rotating devices, one of said rotary devices comprising a commutator having segments, a plurality of which are conductive and are electrically connected, and are separated from one another by intermediate segments electrically insulated from the said connected segments, a brush for such commutator, a circuit for such brush and commutator to which are applied current impulses corresponding to the signal-transmitting current variations, and controlling means for said correcting mechanism also included in said commutator circuit and arranged to be operated immediately and in turn to cause such correcting mechanism to operate immediately, when said brush is on one of said connected commutator segments at a time when a current impulse is applied to such commutator circuit as aforesaid, and a delay action relay arranged to limit, to a fraction of the duration of the corresponding current variation, the period of application of current to such commutator circuit.

12. In a telegraph system, the combination of two rotary distributers, means for driving the same, means comprising a connecting circuit for transmitting current impulses from the one distributer to the other, and for varying such impulses for the transmission of signals, correcting mechanism adapted for restoring proper phase relation between such distributers, and comprising an operating magnet, one of such distributers comprising a commutator having segments, a plurality of which are conductive and are electrically connected, and are separated from one another by intermediate segments electrically insulated from the connected segments, a brush for such commutator, a circuit for such brush and commutator, a relay in the circuit connecting said distributers and arranged to repeat into such commutator circuit signaling impulses of the circuit connecting said distributers, and controlling means for said correcting mechanism also included in said commutator circuit and arranged to be operated immediately and in turn to energize said operating magnet to cause such correcting mechanism to operate immediately, when such brush is on one of such connected commutator segments at a time when a current impulse is applied to such commutator circuit by said relay, and means for limiting, to a fraction of the duration of the corresponding current variation, the period of application of current to such commutator circuit.

13. In a telegraph system, the combination of two rotary distributers, means for driving the same, means comprising a connecting circuit for transmitting current impulses from the one distributer to the other, and for varying such impulses for the transmission of signals, correcting mechanism adapted for restoring proper phase relation between such distributers, and comprising an operating magnet, one of such distributers comprising a commutator having segments, a plurality of which are conductive and are electrically connected, and are separated from one another by intermediate segments electrically insulated from the connected segments, a brush for such commutator, a circuit for such brush and commutator, a relay in the circuit connecting said distributers and arranged to repeat into such commutator circuit signaling impulses of the circuit connecting said distributers, and controlling means for said correcting mechanism also included in said commutator circuit and arranged to be operated immediately and in turn to energize said operating magnet to cause such correcting mechanism to operate immediately, when said brush is on one of such connected commutator segments at a time when a current impulse is applied to such commutator circuit by said relay, and a relay in said commutator circuit and arranged to limit, to a fraction of the duration of the corresponding current variation, the period of application of current to such commutator circuit.

14. In a telegraph system, the combination of two rotary distributers, means for driving the same, means comprising a connecting circuit for transmitting current impulses from the one distributer to the other, and for varying such impulses for the transmission of signals, correcting mechanism adapted for restoring proper phase relation between such distributers, one of such distributers comprising a commutator having segments, a plurality of which are conductive and are electrically connected, and are separated from one another by intermediate segments electrically insulated from the connected segments, a brush for such commutator, a circuit for such brush and commutator, a relay in the circuit connecting said distributers and arranged to repeat into such commutator circuit signaling impulses of the circuit connecting said distributers, and controlling means for said correcting mechanism also included in said commutator circuit and arranged to be operated immediately and in turn to cause such correcting mechanism to operate immediately, when said brush is on one of such connected commutator segments at a time when a current impulse is applied to such commutator circuit by said relay, and a delay action relay in said commutator circuit and arranged to limit, to a fraction of the duration of the corresponding current variation, the period of application of current to such commutator circuit.

15. In a synchronous telegraph system, the combination of a rotary distributer comprising a commutator and a brush therefor, means including current reversing means for transmitting electric current signaling impulses to or from such distributer, correcting mechanism for the distributer comprising an operating electro-magnet and a circuit therefor controlled by such commutator and brush, means operated by said signaling impulses causing said correcting mechanism to operate, when occasion for correction arises, immediately following a current reversal incident to such signaling impulses, and means preventing more than one operation of such correcting mechanism for each individual closure of circuit through such commutator.

16. In a synchronous telegraph system, the combination of a rotary distributer comprising a commutator and a brush therefor, means including current reversing means for transmitting electric current signaling impulses to or from said distributer, correcting mechanism for the distributer comprising an operating electromagnet and a circuit therefor controlled by such commutator and brush, means operated by said signaling impulses causing said correcting mechanism to operate, when occasion for correction arises, immediately following a current reversal incident to such signaling impulses, and means comprising a relay and a circuit therefor preventing more than one operation of such correcting mechanism for each individual closure of circuit through such commutator.

17. In a synchronous telegraph system, the combination of a rotary distributer comprising a commutator and a brush therefor, correcting mechanism for the distributer comprising an operating electromagnet and a circuit therefor controlled by such commutator and brush, and means comprising a relay and a circuit therefor preventing more than one operation of such correcting mechanism for each individual closure of such circuit through said commutator.

18. In a synchronous telegraph system, the combination of a rotary distributer comprising a commutator and a brush therefor, correcting mechanism for the distributer comprising an operating electromagnet and a circuit therefor controlled by such commutator and brush, and means preventing more than one operation of such correcting mechanism for each individual closure of such circuit through said commutator comprising means for closing a holding circuit through said electromagnet following the closing of the circuit through the commutator to said electromagnet.

19. In a synchronous telegraph system, the combination of a rotary distributer comprising a commutator divided into segments alternately insulated and conductive, and a brush for such commutator, means arranged alternately to apply, and to interrupt the application of, current to such conductive segments of the commutator, correcting mechanism for the distributer comprising an operating electromagnet and a circuit therefor controlled by such commutator and brush, and contact means controlled by the means controlling the application of current to such commutator, such contact means arranged to close a holding circuit through the said electromagnet.

20. In a synchronous telegraph system, the combination of a rotary distributer comprising a commutator divided into segments alternately insulated and conductive, and a brush for such commutator, means arranged alternately to apply, and to interrupt the application of, current to such conductive segments of the commutator, correcting mechanism for the distributer comprising an operating electromagnet and a circuit therefor controlled by such commutator and brush, and a relay controlled by the means controlling the application of current to such commutator, such relay arranged to close a holding circuit through the said electromagnet.

21. In a synchronous telegraph system, the combination of a rotary distributer comprising a commutator divided into segments alternately insulated and conductive, and a brush for such commutator, means arranged alternately to apply, and to interrupt the application of, current to such conductive segments of the commutator, correcting mechanism for the distributer comprising an operating electromagnet and a circuit therefor controlled by such commutator and brush, and a delay action relay controlled by the means controlling the application of current to such commutator, such delay action relay arranged to close a holding circuit through the said electromagnet.

22. In a synchronous telegraph system, the combination of a rotary distributer comprising a commutator divided into segments alternately insulated and conductive, and a brush for such commutator, a main correcting relay arranged alternately to apply, and to interrupt the application of, current to such conductive segments of the commutator, correcting mechanism for the distributer comprising an operating electromagnet and a circuit therefor controlled by such commutator and brush, and a relay controlled by said main correcting relay and also controlling such circuit, and arranged to close a holding circuit through the said electromagnet.

23. In a synchronous telegraph system, the combination of a rotary distributer comprising a commutator divided into segments alternately insulated and conductive, and a brush for such commutator, means arranged alternately to apply, and to interrupt the application of, current to such conductive segments of the commutator, correcting mechanism for the distributer comprising an operating electromagnet and a circuit therefor controlled by such commutator and brush, a delay action relay controlled by the means controlling the application of current to such commutator, and itself also controlling the application of current to such commutator, and another relay controlled by such delay action relay and arranged to close a holding circuit through the said electromagnet.

24. In a synchronous telegraph system, the combination of a rotary distributer comprising a commutator divided into segments alternately insulated and conductive, and a brush for such commutator, a main correcting relay arranged alternately to apply, and to interrupt the application of, current to such conductive segments of the commutator, correcting mechanism for the distributer comprising an operating electromagnet and a circuit therefor controlled by said commutator and brush, a delay action relay itself controlled by said main correcting relay and itself also controlling the application of current to such commutator, and a further relay controlled by said delay action relay and also by the commutator, and arranged to close a holding circuit through the said electromagnet.

25. In a synchronous telegraph system, the combination of a rotary distributer comprising a commutator divided into segments alternately insulated and conductive, and a brush for such commutator, correcting mechanism for the distributer comprising ratchet mechanism and an electromagnet for operating the same, a circuit extending from such brush to said magnet and means arranged alternately to apply, and to interrupt the application of, current to such conductive segments of the commutator, and means actuated by said circuit when completed, for closing a holding circuit through the magnet of said ratchet mechanism to prevent premature deënergization of such magnet.

26. In a synchronous telegraph system, the combination of a rotary distributer, comprising a commutator divided into segments alternately insulated and conductive, and a brush for such commutator, correcting mechanism for the distributer comprising ratchet mechanism and an electromagnet for operating the same, a circuit extending from such brush to said magnet, such correcting mechanism comprising contact means operated by the ratchet mechanism and arranged to break the said circuit after one stroke of the ratchet mechanism has begun, means arranged alternately to apply, and to interrupt the application of, current to such conductive segments of the commutator, and means actuated by said circuit when completed, for closing a holding circuit through the magnet of said ratchet mechanism around the said contact means of said ratchet mechanism to prevent premature deënergization of such magnet.

27. In a synchronous telegraph system, the combination of a rotary distributer, comprising a commutator divided into segments alternately insulated and conductive, and a brush for such commutator, correcting mechanism for the distributer comprising ratchet mechanism and an electromagnet for operating the same, a circuit extending from such brush to said magnet, such correcting mechanism comprising contact means operated by the ratchet mechanism and arranged to break the said circuit after one stroke of the ratchet mechanism has begun and to restore such circuit during the opposite stroke of such ratchet mechanism, means arranged alternately to apply, and to interrupt the application of, current to such conductive segments of the commutator, and means actuated by said circuit when completed, for closing a holding circuit through the magnet of said ratchet mechanism around the said contact means of said ratchet mechanism to prevent premature deënergization of such magnet.

28. In a synchronous telegraph system, the combination of a rotary distributer comprising a commutator divided into segments alternately insulated and conductive, and a brush for such commutator, correcting mechanism for the distributer comprising ratchet mechanism and an electromagnet for operating the same, a main correcting relay arranged alternately to apply, and to interrupt the application of, current to such conductive segments of the commutator, a circuit extending from such brush to said magnet, a delay action relay controlled by said main correcting relay and itself controlling such circuit, such correcting mechanism comprising contact means operated by the ratchet mechanism and arranged to break the said circuit after one stroke of the ratchet mechanism has begun, and to restore such circuit during the opposite stroke of such ratchet mechanism, and a further relay controlled by said commutator and by said delay action relay and arranged to close a holding circuit through said magnet and around said contact means of said ratchet mechanism.

29. In a synchronous telegraph system, the combination of a line circuit, a rotary distributer, means including current reversing means for transmitting current impulses through such line circuit to the distributer for the transmission of signals, said distributer comprising a commutator and brush therefor, one of which is rotatable with respect to the other, such commutator divided into segments of a number such that at normal rotative speed the brush passes at least one of such segments for each such variation of the line current, and correcting means for said distributer for correcting that distributer in its phase relation to the current reversals in the line circuit, comprising an operating magnet, and controlling means for such correcting mechanism influenced both by the current variations in the line circuit and by the closing of contact between segments of the commutator and the said brush, and arranged to energize said operating magnet to cause operation of such correcting mechanism immediately following a current reversal in the event of non-coincidence in phase of the distributer with respect to the current reversals in said line circuit.

30. In a synchronous telegraph system, the combination of a line circuit, two rotary distributers connected by such line circuit, one of such distributers comprising a segmented transmitting commutator, the other of said distributers comprising a correspondingly segmented correcting commutator, independent means for driving said distributers, transmitting means operating through the transmitting commutator to the line circuit and comprising a plurality of sets of contacts adapted to be set up in varying combinations for the transmission of characters in code form, correcting means for the other of said distributers arranged to be influenced both by the correcting commutator of such distributer and by transmitted signals in the line circuit to restore phase coincidence of the two distributers in the event of non-coincidence in phase, means adapted to close at will and for so long as required, the transmitting circuit connection to one of the segments of the transmitting commutator, and means for disconnecting from said correcting means at will and so long as required, all of the segments of the correcting commutator except that segment corresponding to the particular segment of the transmitting commutator to which circuit is so closed.

31. In a synchronous telegraph system, the combination of a line circuit, two rotary distributers connected by such line circuit, one of such distributers comprising a segmented transmitting commutator, the other of said distributers comprising a correspondingly segmented correcting commutator, independent means for driving said distributers, transmitting means operating through the transmitting commutator to the line circuit and comprising a plurality of sets of contacts adapted to be set up in varying combinations for the transmission of characters in code form and comprising a magnet and means operated thereby such that the magnet when energized holds said contacts open, correcting means for the other of said distributers arranged to be influenced both by the correcting commutator of such distributer and by transmitted signals in the line circuit to restore phase coincidence of the two distributers in the event of non-coincidence in phase, switch means adapted to close at will and for so long as required, and independent of said transmitter contacts, the transmitting circuit connection to one of the segments of the transmitting commutator and to close simultaneously a circuit through said transmitter magnet, and means for disconnecting from said correcting means at will and so long as required, all of the segments of the correcting commutator except that segment corresponding to the particular segment of the transmitting commutator to which circuit is so closed.

32. In a synchronous telegraph system, the combination of a line circuit, two rotary distributers connected by such line circuit, a plurality of independent transmitting means and a corresponding plurality of independent receiving means, each transmitting means and its corresponding receiving means connected through said distributers and line circuit, said distributers arranged to connect each transmitter and its corresponding receiving means to the line in alternation with the other transmitter or transmitters and corresponding receiving means, said transmitting means each operating by change of current polarity, and correction mechanism for one of said distributers controlled by the current reversals in such circuit, the relation being such that each reversal of the line current affords an opportunity for operation of such correction mechanism, one of said transmitting means arranged to send through the line, when at rest, impulses of one direction, another to send through the line, when at rest, impulses of the opposite direction, whereby current reversals occur in the line circuit when the transmitters are at rest, thereby affording opportunities for correction with the transmitters at rest.

33. A synchronizing system comprising two moving bodies having independent driving members, means for automatically producing relative motion between one of said bodies and its driving member to bring said moving bodies into synchronism, and means controlled thereby for insuring the completion of each movement.

34. A synchronizing system comprising two rotatable bodies having independent driving members, shifting means for introducing relative motion between one of said bodies and its driving member to bring said rotatable bodies into synchronism, locking means for insuring the completion of each shifting action, and mechanism controlled by said shifting means for releasing said locking means.

35. A synchronizing system comprising an independently driven transmitting current collector, a receiving current distributer having a brush carrying arm, a driving member therefor, means responsive to current impulses controlled by said collector for producing relative motion between said arm and said driving member, and local circuit connections controlled by said means for insuring the completion of each movement and for causing the return of said means to normal position.

36. A synchronizing mechanism comprising a contact head, a brush carrying arm associated therewith, means for rotating said arm, an electromagnet and coöperating mechanical elements for moving said arm independently of said means, a relay for completing an operative circuit for said electromagnet, and circuit connections controlled by said elements for affecting said circuit.

In testimony whereof we have signed this specification in the presence of two subscribing witnesses.

GEORGE M. YORKE.
GEORGE R. BENJAMIN.

Witnesses:
LEWIS MCKISICK,
G. A. FIGG.